US012101630B2

(12) United States Patent
Yang et al.

(10) Patent No.: US 12,101,630 B2
(45) Date of Patent: Sep. 24, 2024

(54) MOBILE DEVICE AUTHENTICATION WITHOUT ELECTRONIC SUBSCRIBER IDENTITY MODULE (eSIM) CREDENTIALS

(71) Applicant: Apple Inc., Cupertino, CA (US)

(72) Inventors: Xiangying Yang, Cupertino, CA (US); Jean-Marc Padova, San Francisco, CA (US); Li Li, Los Altos, CA (US); Shu Guo, Beijing (CN)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 17/634,950

(22) PCT Filed: Aug. 18, 2019

(86) PCT No.: PCT/CN2019/101239
§ 371 (c)(1),
(2) Date: Feb. 11, 2022

(87) PCT Pub. No.: WO2021/031051
PCT Pub. Date: Feb. 25, 2021

(65) Prior Publication Data
US 2022/0295276 A1 Sep. 15, 2022

(51) Int. Cl.
*G06F 7/04* (2006.01)
*H04L 9/32* (2006.01)
(Continued)

(52) U.S. Cl.
CPC ......... *H04W 12/069* (2021.01); *H04L 9/3247* (2013.01); *H04L 9/3263* (2013.01);
(Continued)

(58) Field of Classification Search
CPC ............... H04L 63/166; H04L 9/3263; H04W 12/0431; H04W 12/041; H04W 12/0433;
(Continued)

(56) References Cited

U.S. PATENT DOCUMENTS 10,798,082 B2 * 10/2020 Li ............................. H04L 9/30
2008/0209206 A1    8/2008 Vaha-Sipila et al.
(Continued)

FOREIGN PATENT DOCUMENTS

CN      109417709 A      3/2019
CN      109691157 A      4/2019
(Continued)

OTHER PUBLICATIONS

Behrad et al., Securing Authentication for Mobile Networks, A Survey on 4G Issues and 5G Answers, Feb. 22, 2018, IEEE, pp. 1-8. (Year: 2018).*
(Continued)

*Primary Examiner* — Philip J Chea
*Assistant Examiner* — Jenise E Jackson
(74) *Attorney, Agent, or Firm* — DICKINSON WRIGHT RLLP

(57) ABSTRACT

This application sets forth techniques for authenticating a mobile device with a cellular wireless network without electronic Subscriber Identity Module (eSIM) credentials by using an Extensible Authentication Protocol Transport Layer Security (EAP-TLS) procedure. The mobile device authenticates with an Authentication Server Function (AUSF) of the cellular wireless network using an embedded Universal Integrated Circuit Card (eUICC) certificate. Processing circuitry of the mobile wireless device external to the eUICC implements the EAP-TLS procedure and authenticates validity of the AUSF. In some embodiments, the eUICC provides key generation and storage for a session key for communication between the mobile device and the cellular wireless network. In some embodiments, a third-party managed Unified Data Management (UDM) broker authenticates the mobile device based on knowledge of the eUICC certificate and provides a session key to the cellular wireless
(Continued)

network for subsequent communication with the mobile device, upon successful authentication of the mobile device.

25 Claims, 15 Drawing Sheets

(51) Int. Cl.
*H04W 8/20* (2009.01)
*H04W 12/041* (2021.01)
*H04W 12/0431* (2021.01)
*H04W 12/069* (2021.01)
*H04L 9/40* (2022.01)

(52) U.S. Cl.
CPC ......... *H04W 8/205* (2013.01); *H04W 12/041* (2021.01); *H04W 12/0431* (2021.01); *H04L 63/166* (2013.01); *H04L 2209/80* (2013.01)

(58) Field of Classification Search
CPC ....... H04W 12/72; H04W 12/35; G06F 21/35; G06F 21/44; G06F 21/445
See application file for complete search history.

(56) References Cited

U.S. PATENT DOCUMENTS

| | | |
|---|---|---|
| 2009/0209232 A1 | 8/2009 | Cha et al. |
| 2011/0113252 A1 | 5/2011 | Krischer et al. |
| 2013/0227646 A1 | 8/2013 | Haggerty et al. |
| 2016/0174065 A1* | 6/2016 | Li .................... H04W 12/00 455/419 |
| 2016/0277930 A1 | 9/2016 | Li et al. |
| 2017/0104750 A1 | 4/2017 | Li et al. |
| 2017/0127264 A1 | 5/2017 | Yang et al. |
| 2017/0150356 A1 | 5/2017 | Li et al. |
| 2017/0264439 A1* | 9/2017 | Muhanna ............ H04L 63/0428 |
| 2018/0013568 A1* | 1/2018 | Muhanna .............. H04L 9/0822 |
| 2018/0014178 A1* | 1/2018 | Baek ...................... H04W 8/20 |
| 2019/0074983 A1 | 3/2019 | Yang et al. |
| 2019/0141533 A1* | 5/2019 | Kang ................ H04W 12/0471 |
| 2019/0174314 A1* | 6/2019 | Joseph ................. H04W 12/06 |
| 2019/0261178 A1 | 8/2019 | Rajadurai et al. |
| 2020/0029212 A1 | 1/2020 | Lee et al. |
| 2020/0334629 A1* | 10/2020 | Karapantelakis ..... H04W 4/029 |
| 2020/0359203 A1* | 11/2020 | Aono ................... H04L 9/3073 |

FOREIGN PATENT DOCUMENTS

| | | |
|---|---|---|
| WO | 2018008983 A1 | 1/2018 |
| WO | 2019028698 A1 | 2/2019 |
| WO | 2019137630 A1 | 7/2019 |

OTHER PUBLICATIONS

Hamandi et al., W-AKA: Privacy-Enhanced LTE-AKA Using Secured Channel for Wi-Fi, Apr. 19, 2013, IEEE, pp. 1-6. (Year: 2013).*
Chinese Patent Application No. 201980099498.2—First Office Action dated May 23, 2023.
International Search Report and Written Opinion, PCT/CN2019/101239 dated May 20, 2020 (9 pages).
GSM Association; "Embedded SIM Remote Provisioning Architecture", Version 4.0, dated Feb. 25, 2019, 103 pages.
3GPP, "3rd Generation Partnership Project; Technical Specification Group Services and System Aspects; Security architecture and procedures for 5G system (Release 15)", 3GPP TS 33.501 V15.5.0 (Jun. 2019) 190 pages.

* cited by examiner

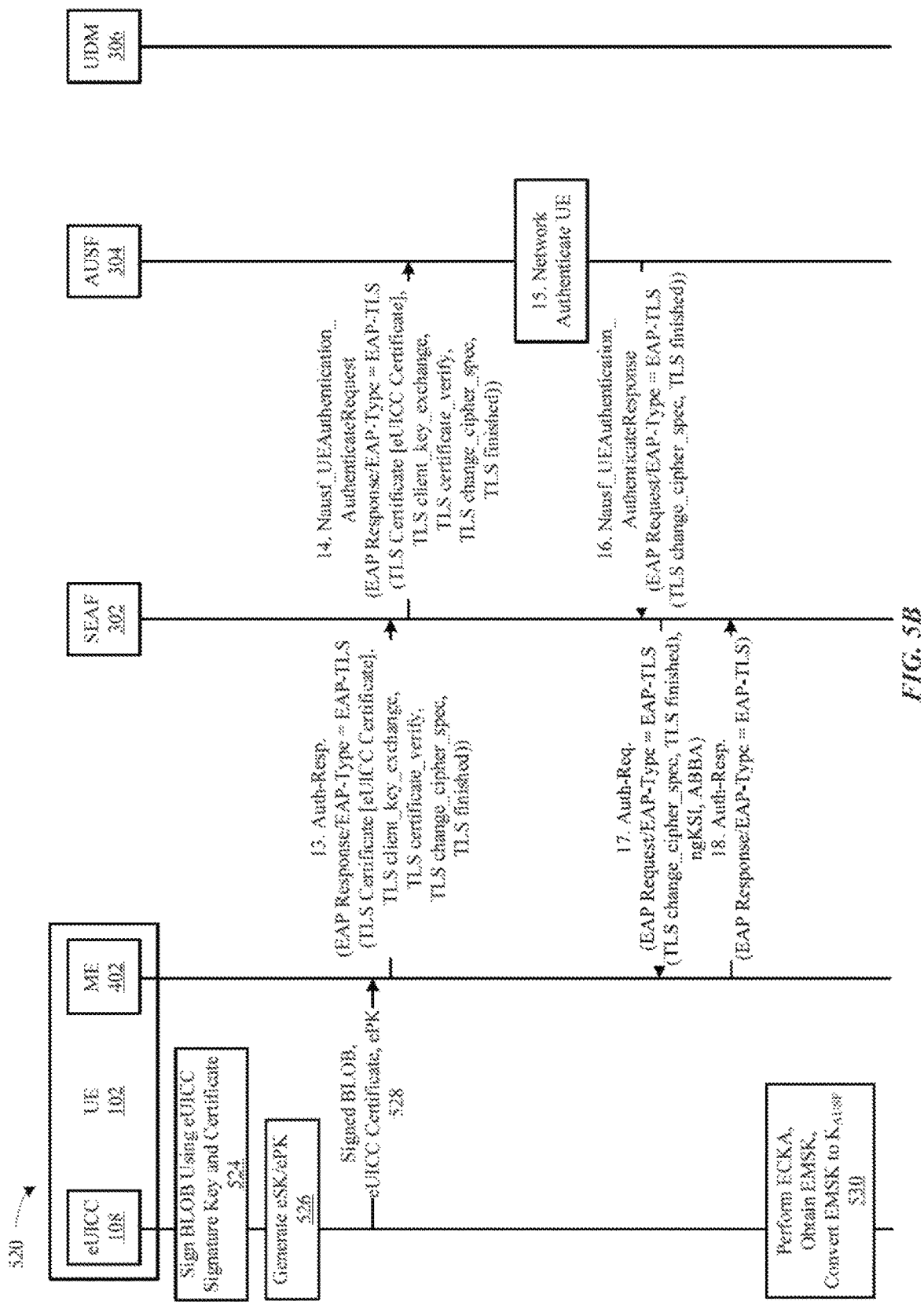

MOBILE DEVICE AUTHENTICATION WITHOUT ELECTRONIC SUBSCRIBER IDENTITY MODULE (eSIM) CREDENTIALS

CROSS-REFERENCE TO RELATED APPLICATIONS

The present application is a National Phase filing of PCT/CN2019/101239, entitled "MOBILE DEVICE AUTHENTICATION WITHOUT ELECTRONIC SUBSCRIBER IDENTITY MODULE (ESIM) CREDENTIALS," filed Aug. 18, 2019, the content of which is incorporated herein by reference in its entirety for all purposes.

FIELD

The described embodiments set forth techniques for authenticating a mobile wireless device to a cellular wireless network, where the mobile wireless device does not include a Subscriber Identity Module (SIM), an electronic SIM (eSIM), or a prAovisioning SIM.

BACKGROUND

Many mobile wireless devices are configured to use removable Universal Integrated Circuit Cards (UICCs) that enable the mobile wireless devices to access services provided by Mobile Network Operators (MNOs). In particular, each UICC includes at least a microprocessor and a read-only memory (ROM), where the ROM is configured to store an MNO profile that the wireless device can use to register and interact with an MNO to obtain wireless services via a cellular wireless network. A profile may also be referred to as subscriber identity module (SIM). Typically, a UICC takes the form of a small removable card, commonly referred to as a SIM card, which is inserted into a UICC-receiving bay of a mobile wireless device. In more recent implementations, UICCs are being embedded directly into system boards of wireless devices. Embedded UICCs (eUICCs) can provide advantages over traditional, removable UICCs, as the eUICCs can include a rewritable memory that can facilitate installation, modification, and/or deletion of one or more electronic SIMS (eSIMs) on the eUICC, where the eSIMs can provide for new and/or different services and/or updates for accessing extended features provided by MNOs. An eUICC can store a number of MNO profiles—also referred to herein as eSIMs—and can eliminate the need to include UICC-receiving bays in wireless devices.

Some mobile wireless devices at initial acquisition by an end user, such as those devices referred to as being SIM-free, may include a bootstrap eSIM (profile) loaded on an eUICC to provide connectivity to an MNO provisioning server for downloading an operational eSIM to allow the mobile wireless device to access services of the MNO. The bootstrap eSIMs can be preloaded on the eUICC of the mobile wireless device without involvement of a specific end user, typically provided by agreement between the mobile wireless device vendor and the MNO. Features of the bootstrap eSIM can be determined by the MNO and can vary for different MNOs to which an end user can seek to customize an acquired mobile wireless device. The bootstrap eSIM can be used for initial downloading of an operational eSIM for an MNO as well, in some cases, for updates of the eSIM or accompanying software used by the MNO on the mobile wireless device. Access to an MNO provisioning server can also depend on a roaming agreement between the MNO and a local cellular wireless network provider when the mobile wireless device is located in a region in which direct access to the MNO's cellular wireless network is not available.

While a provisioning profile can provide access to acquire a fully functional profile, the inclusion and use of such provisioning profiles poses some issues. Limited storage space in an eUICC of the mobile wireless device can be occupied by one or more provisioning profiles for different MNOs. The provisioning profile may have limited or no functionality when the mobile wireless device is roaming. Additionally, limitations on the number of profiles that can be active simultaneously in a mobile wireless device, e.g., only one active profile at a time on an eUICC in some instances, can result in connectivity for an active profile being severed in order to activate a provisioning profile for downloading or updating an eSIM. A provisioning profile being an MNO-issued eSIM profile requires mobile wireless device specific personalization, which may complicate manufacturing and distribution of the mobile wireless device.

An Extensible Authentication Protocol Transport Layer Security (EAP-TLS) procedure used for non-cellular wireless network authentication has been proposed for use on cellular wireless networks. To meet MNO cellular wireless network security levels, execution of the EAP-TLS procedure on a secure element of a mobile wireless device has been recommended; however, limited processing and storage capabilities of the secure element has hampered adoption. Execution of the EAP-TLS procedure outside of the secure element of the mobile wireless device, however, is considered less secure than on the secure element. Thus, there exists a need for a hybrid approach that satisfies MNO cellular wireless network security and processing capabilities of mobile wireless devices.

SUMMARY

This Application sets forth techniques for authenticating a mobile device, also referred to as a user equipment (UE), with a cellular wireless network using an Extensible Authentication Protocol (EAP) Transport Layer Security (TLS) procedure. The UE divides execution of the EAP-TLS procedure between a secure element (SE), e.g., an embedded Universal Integrated Circuit Card (eUICC), and processing circuitry of the UE external to the SE, where this processing circuitry can be referred to as mobile equipment (ME). The EAP-TLS procedure is used i) to authenticate the UE to an Authentication Server Function (AUSF) of the cellular wireless network using an eUICC certificate maintained securely by the eUICC, and ii) to authenticate the AUSF of the cellular wireless network by the ME based on a server certificate. The eUICC of the UE can sign a Binary Large Object (BLOB), which can include a challenge from the AUSF, based on the eUICC certificate, and provide the signed BLOB to the ME for communicating to the AUSF as part of the EAP-TLS procedure. The ME of the UE can verify messages received from the AUSF using certificate revocation lists and time-stamp checking to determine validity of a server certificate provided by the AUSF. The eUICC authenticates itself (and therefore the UE) to the AUSF based on the eUICC certificate, while the ME authenticates the AUSF (and therefore the cellular wireless network) based on a server certificate. The ME implements the EAP-TLS procedure with assistance from the eUICC to provide security functions that meet cellular wireless network requirements for secure authentication. In some embodiments, the eUICC provides additional key generation and storage for the EAP-TLS procedure and/or for a subsequent authentication and key agreement (AKA) procedure performed by the UE. In another embodiment, a Unified Data Management (UDM) broker maintained by a third party, e.g., a manufacturer of the UE, authenticates the UE based on the eUICC certificate, which is maintained securely in the eUICC of the UE and known to the UDM broker, and based on additional cryptographic keys, e.g., a network authentication key and a privacy encryption key that can be preconfigured securely on the UE. The UE communicates via the cellular wireless network to the UDM broker to authenticate itself, and when authentication succeeds, the UDM broker generates and provides a session key to the AUSF of the cellular wireless network to use to generate cryptographic keys for subsequent secure communication between the UE and the cellular wireless network. The UE separately generates the session key, which can be used as part of a fifth generation (5G) AKA procedure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

FIGS. 5A, 5B, and 5C illustrate another exemplary sequence of actions to authenticate a mobile wireless device with a cellular wireless network, according to some embodiments.

DETAILED DESCRIPTION

Figure 1:
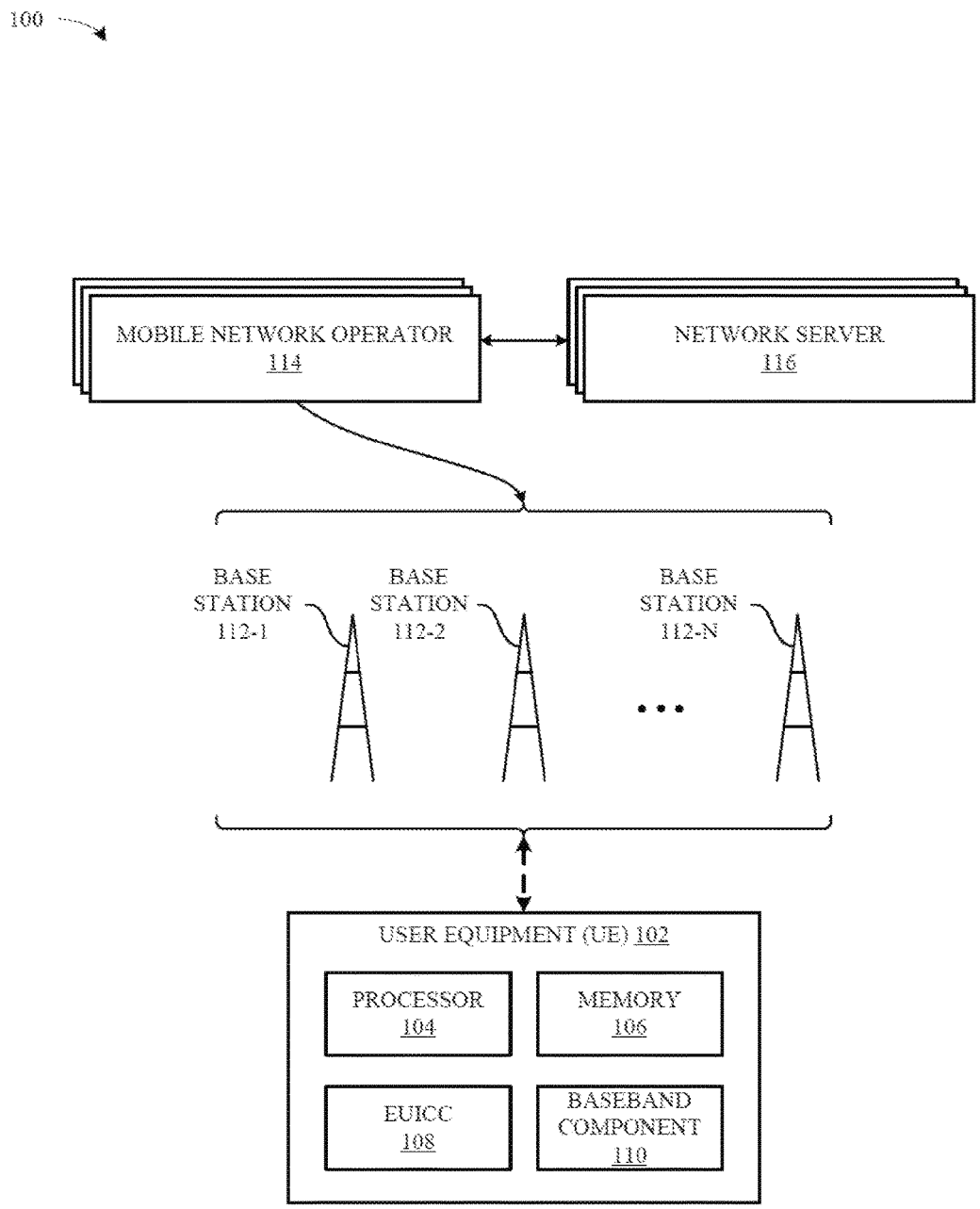
FIG. 1 illustrates a block diagram of different components of an exemplary system configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

This Application sets forth techniques for authenticating a mobile device, also referred to as a user equipment (UE), with a cellular wireless network using an Extensible Authentication Protocol (EAP) Transport Layer Security (TLS) procedure. The UE divides execution of the EAP-TLS procedure between a secure element (SE), e.g., an embedded Universal Integrated Circuit Card (eUICC), and processing circuitry of the UE external to the SE, where this processing circuitry can be referred to as mobile equipment (ME). The EAP-TLS procedure is used i) to authenticate the UE to a network authentication server, e.g., an Authentication Server Function (AUSF) of a fifth generation (5G) cellular wireless network using an eUICC certificate maintained securely by the eUICC, and ii) to authenticate a network entity of the cellular wireless network, e.g., the AUSF, by the ME based on a server certificate provided by the network entity. The techniques described herein leverage platform level security of the UE by including the eUICC participate in the EAP-TLS procedure to satisfy security requirements of the MNO's cellular wireless network, to which the UE seeks to authenticate itself, while allowing the ME to execute the overall EAP-TLS state machine and authenticate the cellular wireless network.

UE authentication can be based on use of a trusted eUICC certificate maintained securely by the UE. The eUICC of the UE can sign a Binary Large Object (BLOB), which can include a challenge from the AUSF, based on the eUICC certificate, and provide the signed BLOB to the ME for communicating to the AUSF as part of the EAP-TLS procedure. The ME of the UE can verify messages received from the AUSF based on a server certificate provided by the AUSF and can use certificate revocation lists, online certificate status protocol (OCSP) stapling, and time-stamp checking to determine validity of the server certificate provided by the AUSF. The eUICC authenticates itself (and therefore the UE) to the AUSF based on the eUICC certificate, while the ME authenticates the AUSF (and therefore the cellular wireless network) based on the server certificate. The ME implements the EAP-TLS procedure with assistance from the eUICC to provide security functions that meet cellular wireless network requirements for secure authentication.

Cryptographic key generation and storage can be performed by the eUICC and/or by the ME. In some embodiments, the ME generates an ephemeral public/private key pair {ePK, eSK} and provides the ephemeral public key (ePK) to the cellular wireless network as part of the TLS client key exchange to use for additional security in generating cryptographic keys for secure communication session between the UE and the cellular wireless network. In some embodiments, the ME generates a root session key $K_{AUSF}$ using an elliptic curve key agreement (ECKA) procedure to obtain an extended master session key (EMSK) with which the root session key $K_{AUSF}$ can be derived. The root session key $K_{AUSF}$ can be used subsequently as part of a key derivation function (KDF) to derive additional non-access stratum (NAS) layer and access stratum (AS) layer cryptographic keys for secure communication between the UE and network entities of the cellular wireless network. In some embodiments, the eUICC implements key generation and storage for the EAP-TLS procedure, e.g., to generate the session key $K_{AUSF}$, to generate ephemeral keys, and/or for subsequent authentication and key agreement (AKA) procedures performed by the UE. The eUICC can provide cryptographic keys to the ME during the EAP-TLS procedure, e.g., an ephemeral public key ePK and/or a subsequently derived session key $K_{AUSF}$ for the ME to use to generate additional NAS layer and/or AS layer cryptographic keys.

In another embodiment, a Unified Data Management (UDM) broker maintained by a third party, e.g., a manufacturer of the UE, authenticates the UE based on the eUICC certificate, which is maintained securely within the eUICC of the UE and optionally known to the UDM broker in advance, and based on additional cryptographic keys, e.g., a network authentication key $PK_{auth}$ used for generating session keys, where the generated keys are subsequently used for initial authentication to access a home network for the UE, and a cipher key $PK_{enc}$ used for encryption of identifiers of the UE to maintain privacy. Both the network authentication key $PK_{auth}$ and the cipher key $PK_{enc}$ can be preconfigured securely on the eUICC of the UE. The eUICC can also be preconfigured with or dynamically select a home public land mobile network (HPLMN) and use a dummy identifier, e.g., an international mobile subscription identifier (IMSI) having an unused mobile subscription identifier (MSIN) value, such as an all-zeroes value, to identify the UE to an access network entity, which can forward communication from the UE to a core network entity to provide to the UDM broker for authentication. In some embodiments, the UE provides an encrypted version of a unique equipment identifier (EID) to the UDM broker to identify the UE to the UDM broker to authenticate itself, where the UDM broker can determine an applicable eUICC certificate for the UE based on the provided EID. In some embodiments, the UE provides an encrypted version of a eUICC certificate to the UDM broker for authentication. The UDM broker verifies validity of the eUICC certificate to authenticate the UE, and when authentication succeeds, the UDM broker generates and provides a session key, e.g., $K_{AUSF}$, to the AUSF of the cellular wireless network to use to generate cryptographic keys for subsequent secure communication between the UE and the cellular wireless network. The UE separately generates the session key $K_{AUSF}$, which can be used alone or in combination with ephemeral keys by the UE to generate additional cryptographic keys, e.g., as part of a 5G AKA procedure, for secure communication between the UE and the cellular wireless network.

In some embodiments, roaming scenarios can be accommodated by having a network entity, e.g., a security anchor function (SEAF), of a serving network, in which the UE is roaming, communicate EAP payloads to a network entity, e.g., the AUSF, of a home network for which the UE can be preconfigured for communication. The SEAF can use a basic EAP stack to transport EAP payloads without knowledge of the contents of the EAP payloads. In some embodiments, the SEAF can recognize non-standard messaging, e.g., for HPLMN selection using a dummy IMSI value, to forward messages to a home network for further processing to authenticate the UE.

Authentication of a UE that does not include SIM or eSIM credentials can be used for access to a server for provisioning of eSIM credentials. Authentication as discussed herein can also be used for basic wireless devices to gain cellular wireless network access without requiring SIM/eSIM credentials installed thereon, e.g., for Internet of Things (IoT) devices and the like.

These and other embodiments are discussed below with reference to FIGS. 1-9; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, which can also be referred to as a mobile wireless device, a wireless device, a mobile device, and the like, a group of base stations 112-1 to 112-n that are managed by different Mobile Network Operators (MNOs) 114, and a set of network servers 116 that are in communication with the MNOs 114. The UE 102 can represent a mobile computing device (e.g., an iPhone® or an iPad® by Apple®), the base stations 112-1 to 112-n can represent cellular wireless network entities including evolved NodeBs (eNodeBs or eNBs) and/or next generation NodeBs (gNodeBs or gNB) that are configured to communicate with the UE 102, and the MNOs 114 can represent different wireless service providers that provide specific services (e.g., voice and data) to which the UE 102 can be subscribed.

As shown in FIG. 1, the UE 102 can include processing circuitry, which can include a processor 104 and a memory 106, a secure element, such as an embedded Universal Integrated Circuit Card (eUICC) 108, and a baseband component 110, which can be included in wireless circuitry for wireless communication by the UE. In some embodiments, the UE 102 includes one or more physical UICCs, also referred to as Subscriber Identity Module (SIM) cards (not shown), in addition to or substituting for the eUICC 108. The components of the UE 102 work together to enable the UE 102 to provide useful features to a user of the UE 102, such as cellular wireless network access, non-cellular wireless network access, localized computing, location-based services, and Internet connectivity. The eUICC 108 can be configured to store multiple electronic SIMS (eSIMs) for accessing different MNOs 114 through the base stations 112-1 to 112-n. For example, the eUICC 108 can be configured to store and manage one or more eSIMs for one or more MNOs 114 for different subscriptions to which the UE 102 is associated. To be able to access services provided by the MNOs, an eSIM can be provisioned to the eUICC 108. In some embodiments, the eUICC 108 obtains one or more eSIMs (or updates for one or more eSIMs) from one or more associated network servers 116. It is noted that network servers 116 can be maintained by a manufacturer of the UE 102, the MNOs 114, third party entities, and the like. Communication of eSIM data between a network server 116 and the eUICC 108 (or between the network server 116 and processing circuitry of the UE 102 external to the eUICC 108, e.g., the processor 104) can use a secure communication channel.

The UE 102, upon acquisition by a user, can lack an activated eSIM and require the user to select an MNO 114 and download a functional eSIM for the MNO 114 from a corresponding network server 116. In some instances, the UE 102 may not include a provisioning eSIM to connect to a base station 112 to reach the network server 116. In some instances, the UE 102 can authenticate itself with the network server 116 (or with one or more other network entities of an MNO cellular wireless network) based on a trusted certificate preconfigured to and maintained by a secure element, e.g., the eUICC 108, of the UE 102. In some embodiments, the UE 102 authenticates itself with a cellular wireless network using an Extensible Authentication Protocol Transport Layer Security (EAP-TLS) procedure implemented in part on the eUICC 108 and in part on processing circuitry of the UE 102 external to the eUICC 108, e.g., the processor 104, memory 106, and/or baseband component 110.

Figure 2:
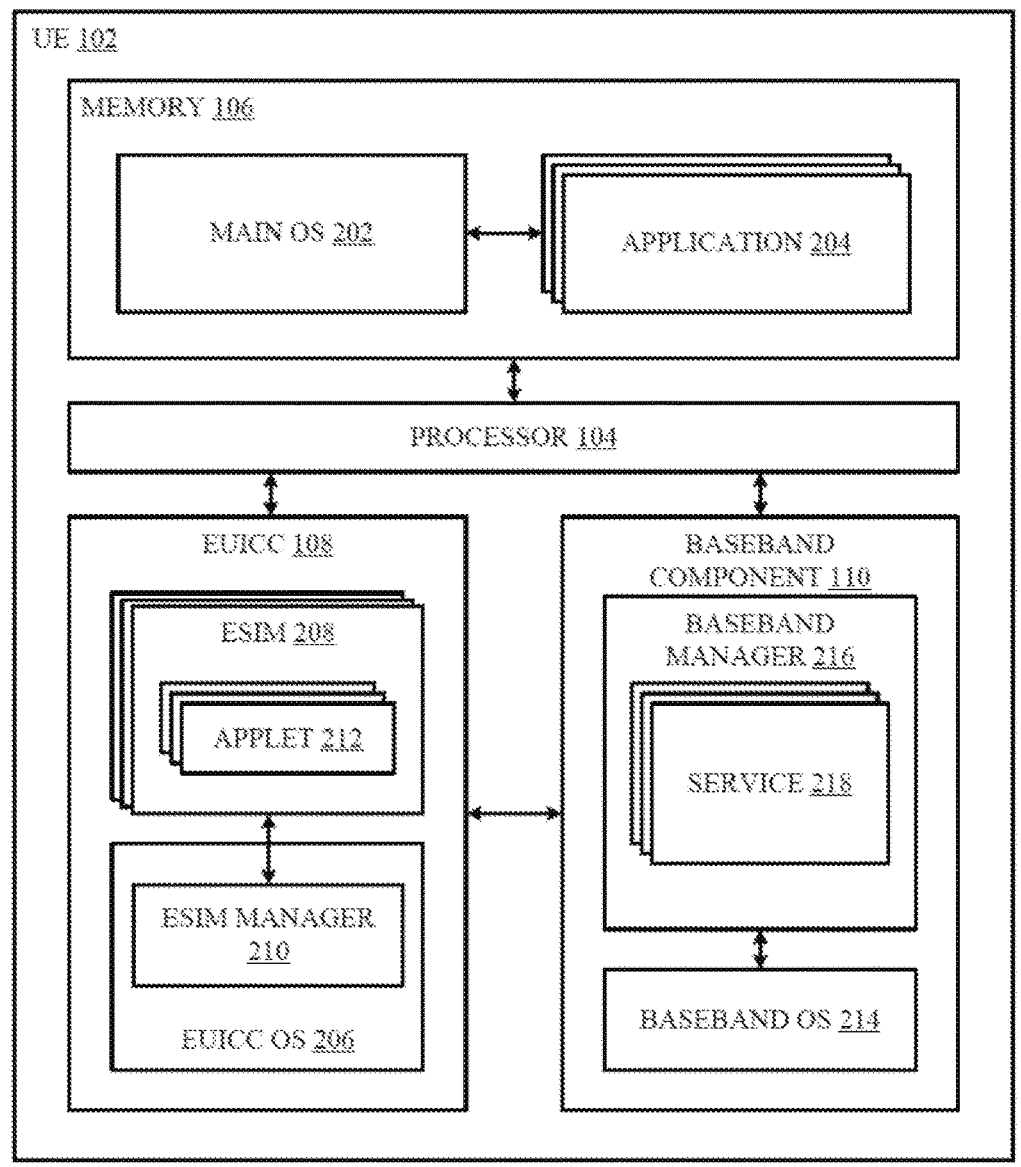
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs 208. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., phone calls and internet) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Upon initial configuration, the UE 102 can have no eSIMs 208 installed thereon. The UE 102 can also lack a provisioning eSIM 208 with which to connect to a network server 116 designated for provisioning eSIMs 208 to the UE 102. In order to access a cellular wireless network, the UE 102 must authenticate itself to the cellular wireless network as well as authenticate communication from the cellular wireless network. The eUICC 108 can store, maintain, and use an eUICC certificate as part of an EAP-TLS procedure to authenticate the UE 102 to the cellular wireless network. The processing circuitry of the UE 102 external to the eUICC 108 can verify validity of a network provided server certificate to authenticate the cellular wireless network. As computational processing power and storage of the eUICC 108 can be limited, only a portion of the EAP-TLS procedure can be implemented by the eUICC 108, while the overall state machine and additional processing not implemented by the eUICC 108, can be performed by the processing circuitry of the UE 102 external to the eUICC 108.

Figure 3A:
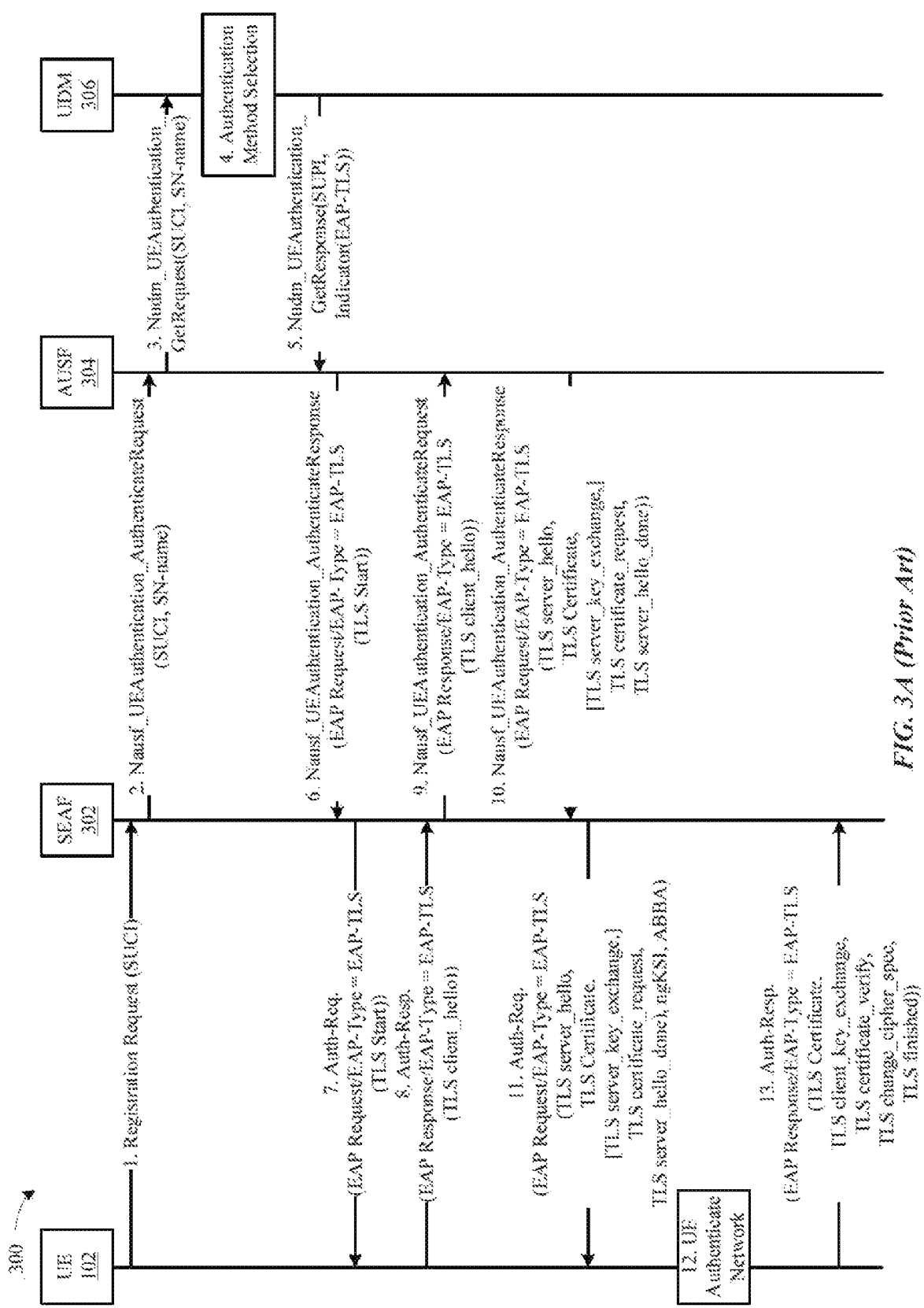
FIGS. 3A and 3B illustrate a prior art exemplary sequence of actions performed by a mobile wireless device and various cellular wireless network entities to implement an Extensible Authentication Protocol Transport Layer Security (EAP-TLS) procedure, according to some embodiments.
Figure 3B:
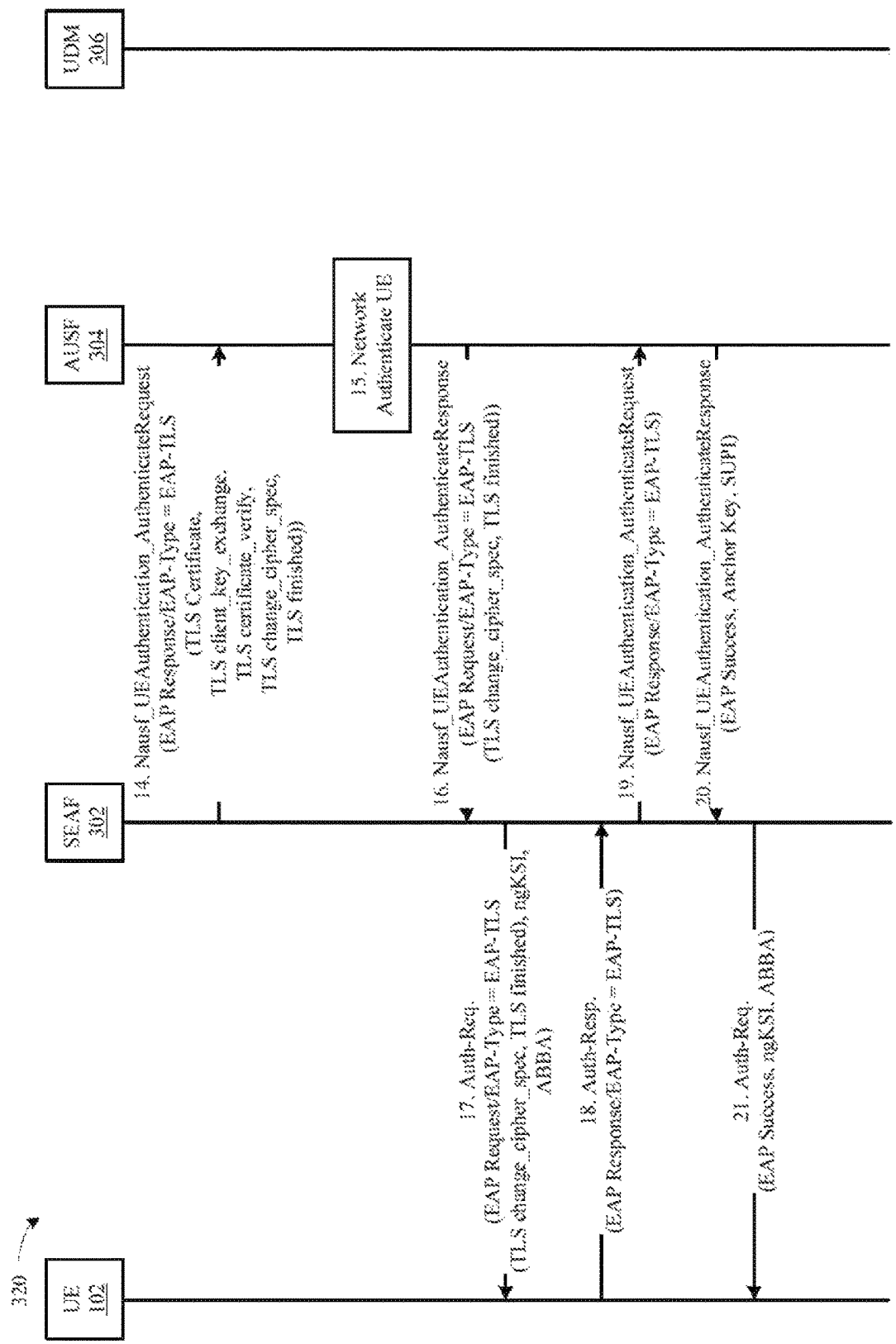

FIGS. 3A and 3B illustrate diagrams 300, 320 of communication between a UE 102 and several cellular wireless network entities to implement a prior art EAP-TLS procedure for the UE 102 to authenticate with a network server, e.g., the AUSF 304, which can be in a core network portion of a cellular wireless network. The UE 102 communicates via the SEAF 302, which can be in an access network portion of the same cellular wireless network or of a different cellular wireless network for roaming scenarios. The UE 102 can send a registration request message (action #1) to the SEAF 302 including an encrypted identifier for the UE 102, e.g., a subscription concealed identifier (SUCI). The SEAF 302 requests authentication of the UE 102 by forwarding the SUCI along with a serving network (SN) name (action #2) to the AUSF 304, which forwards the request (action #3) to the Unified Data Management (UDM) 306 server. A Subscription Identifier De-concealing Function (SIDF) of the UDM 306 derives an unencrypted Subscription Permanent Identifier (SUPI) from the SUCI, and the UDM 306 selects (action #4) an authentication method, namely to use EAP-TLS for authentication of the UE 102. The UDM 306 indicates EAP-TLS for authentication and includes the SUPI in an authentication response message (action #5) provided to the AUSF 304. The AUSF 304 initiates the EAP-TLS procedure (action #6) by sending an authentication response that includes an EAP request with EAP-TLS specified and a TLS Start indication to the SEAF 302, which forwards the EAP request (action #7) in an Authentication Request (Auth-Req.) message along with a next generation (5G) Key Set Identifier (ngKSI) and an Anti-Bidding down Between Architectures (ABBA) parameter to the UE 102 to initiate the EAP-TLS. The UE 102 replies (action #8) to the SEAF 302 with an Authentication Response (Auth-Resp.) message that includes an EAP-TLS client hello indication, which is forwarded (action #9) to the AUSF 304 in a UE Authentication Request message. The AUSF 304 replies (action #10) with a UE Authentication Response message that includes a server certificate for the UE 102 to use to authenticate the AUSF 304 (and therefore the cellular wireless network to which the AUSF 304 belongs) and a request for a certificate from the UE 102. The UE Authentication Response message from the AUSF 304 may also include one or more server cryptographic keys. The SEAF 302 forwards the content of the UE Authentication Response message received from the AUSF 304 to the UE 102 in an Authentication Response message (action #11) along with the ngKSI and ABBA parameters. The UE 102 authenticates the AUSF 304 (action #12) based on contents of the received Authentication Response message. The UE 102 can be pre-configured with one or more certificates to verify the server certificate received from the AUSF 304 via the SEAF 302. When authentication of the AUSF 304 succeeds, the UE 102 sends an Authentication Response message to the SEAF 302 (action #13) with content that includes a UE certificate and one or more UE cryptographic keys. The SEAF 302 forwards the content of the Authentication Response message, including the UE certificate, to the AUSF 304 (action #14) for authentication of the UE 102. The AUSF 304 authenticates the UE 102 (action #15) based on the UE certificate, including verification that the UE certificate corresponds to the SUPI received from the UDM 306. The AUSF 304 can be pre-configured with certification authority (CA) certificates as well as certificate revocation lists (CRLs) on online certificate status protocol (OCSP) information to use for verifying the UE certificate. When authentication of the UE 102 succeeds, the AUSF 304 sends an Authentication Response message (action #16) indicating a cipher specification change to the SEAF 302, which forwards the content of the message (action #17) with the ngKSI and ABBA parameters to the UE 102. The UE 102 replies to the SEAF 302 with an empty Authentication Response message (action #18), which is forwarded (action #19) to the AUSF 304. The AUSF 304 response with a final UE Authentication Response message (action #20) indicating success of the EAP-TLS procedure and includes a derived anchor cryptographic key to the SEAF 302 along with the SUPI of the UE 102. The SEAF 302 forwards the EAP-TLS success indication (action #21) to the UE 102 along with the ngKSI and ABBA parameters.

Figure 4A:
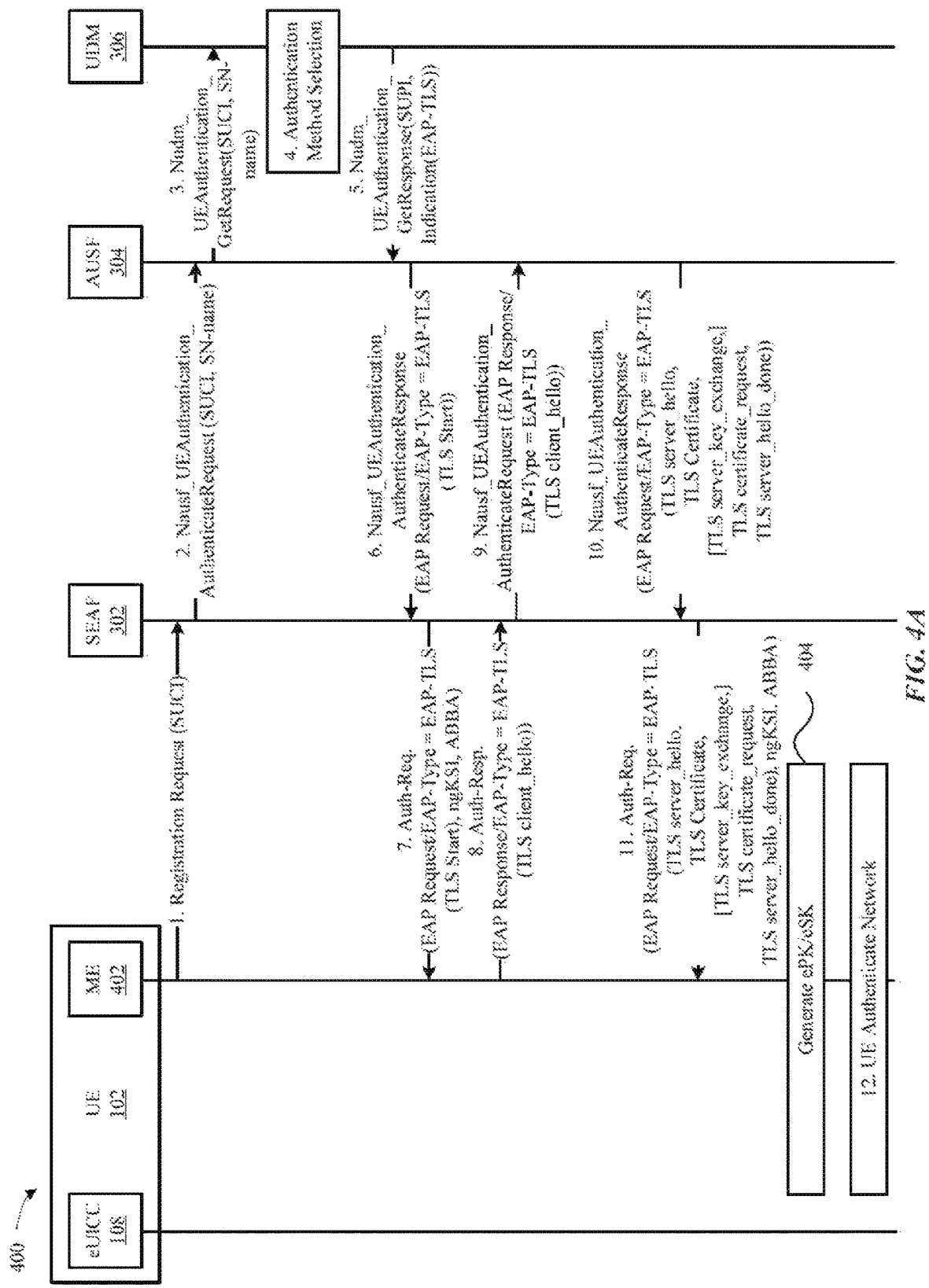
FIGS. 4A, 4B, and 4C illustrate an exemplary sequence of actions to authenticate a mobile wireless device with a cellular wireless network, according to some embodiments.
Figure 4B:
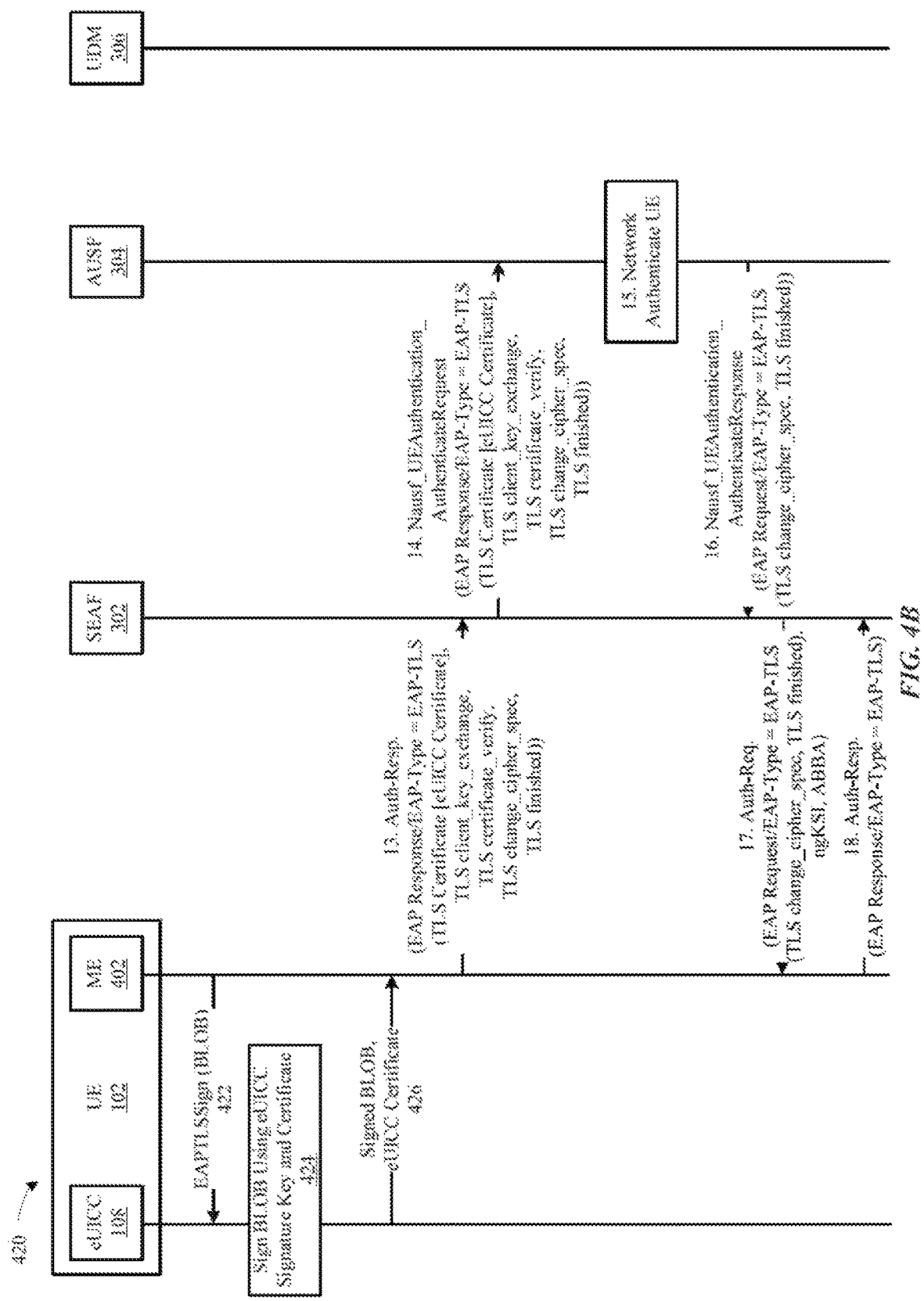
Figure 4C:
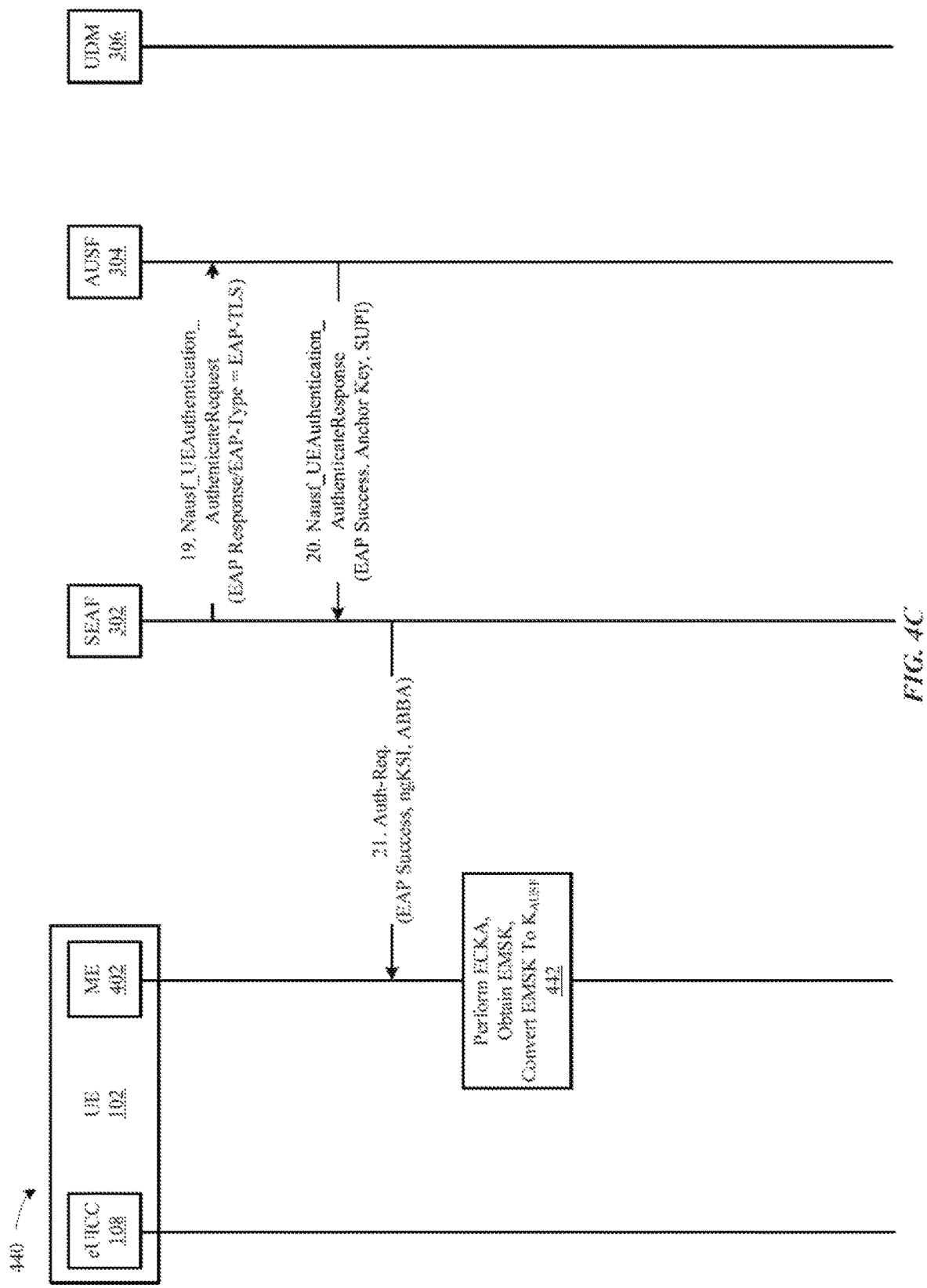

FIGS. 4A, 4B, and 4C illustrate diagrams 400, 420, 440 of an exemplary set of actions performed by different elements of a UE 102 to authenticate the UE 102 with a cellular wireless network using an EAP-TLS procedure. The UE 102 includes the eUICC 108 and processing circuitry of the UE 102 external to the eUICC 108, shown as mobile equipment (ME) 402. The ME 402 executes the state machine to perform the EAP-TLS procedure for the UE 102 to authenticate, while the eUICC 108 provides support functions during the EAP-TLS procedure to satisfy security requirements of the cellular wireless network, namely digital signing by the eUICC 108 based on a securely maintained eUICC private signature key and its associated certificate on behalf of the UE 102. The ME 402 executes the EAP-TLS procedure (actions #1 to #11) and obtains, in an Authentication Request message received from the SEAF 302, a server certificate (indicated as TLS Certificate in action #11) for authentication of a server (namely the AUSF 304) of the cellular wireless network. The Authentication Request message received at action #11 includes a request for a certificate of the UE 102 for authentication purposes and can optionally include server cryptographic key information, such as an indication of cryptographic cipher suites for the UE 102 to use. The ME 402, at 404, can generate ephemeral cryptographic keys, e.g., an ephemeral public key (ePK) and an ephemeral private key (eSK) to use for generation of cipher keys for secure communication between the UE 102 and cellular wireless network when mutual authentication of the EAP-TLS procedure succeeds. The ME 402 authenticates the cellular wireless network (action #12) based on the TLS certificate received in the Authentication Request message of action #11. The ME 402 can use certification revocation lists (CRLs), perform online certificate status protocol (OCSP) stapling procedures, and/or check time-stamps to determine validity of the TLS (server) certificate provided by the AUSF 304 via the SEAF 302. As the eUICC 108 may have limited storage and processing capability, the CRLs, OCSP materials, etc. to verify the TLS (server) certificate are maintained and used by the ME 402 instead. When authentication of the cellular wireless network succeeds, the ME 402, at 422, sends a message, indicated as EAPTLSSign (BLOB), to the eUICC 108, where the content of the EAPTLSSign message, indicated as a Binary Large Object (BLOB), is to be signed by the eUICC 108 using an eUICC private signature key maintained and managed securely by the eUICC 108. In some embodiments, the BLOB to be signed by the eUICC 108 using the eUICC private signature key and its certificate includes some or all of the content to be provided in the Authentication Response message of subsequent action #13. The eUICC 108, at 424, generates a signature for the BLOB based on the private signature key associated with the eUICC certificate and provides, at 426, the signed BLOB along with the eUICC certificate to the ME 402 to include in the Authentication Response message of action #13. Notably, the TLS certificate of the Authentication Response message provided by the ME 402 to the SEAF 302 is the eUICC certificate securely maintained by the eUICC 108 and is not a device level certificate maintained by the ME 402. In some embodiments, the eUICC 108 provides the eUICC certificate to the ME 402 in advance, e.g., before receiving the BLOB at 422, or before signing the BLOB at 424, or before communicating the signed BLOB at 426. In some embodiments, the Authentication Response message of action #13 includes the ephemeral public key ePK generated previously by the ME 402, where the cellular wireless network can use the ephemeral public key ePK during subsequent cryptographic key generation for secure communication between the UE 102 and the cellular wireless network. The SEAF 302, at action #14, forwards the content of the Authentication Response message to the AUSF 304, including the eUICC certificate, for authentication of the UE 102, which occurs at action #15. When authentication of the UE 102 succeeds, the EAP-TLS procedure continues (actions #16 to #21). At 442, the ME 402 of the UE 102 can generate a root session key $K_{AUSF}$ by performing an elliptic curve key agreement (ECKA) procedure to obtain an Extended Master Session Key (EMSK), which can be converted to the root session key $K_{AUSF}$. The root session key $K_{AUSF}$ can be used subsequently using a key derivation function (KDF) to generate additional NAS layer and AS layer cryptographic keys for secure communication between the UE 102 and the cellular wireless network.

Figure 5A:
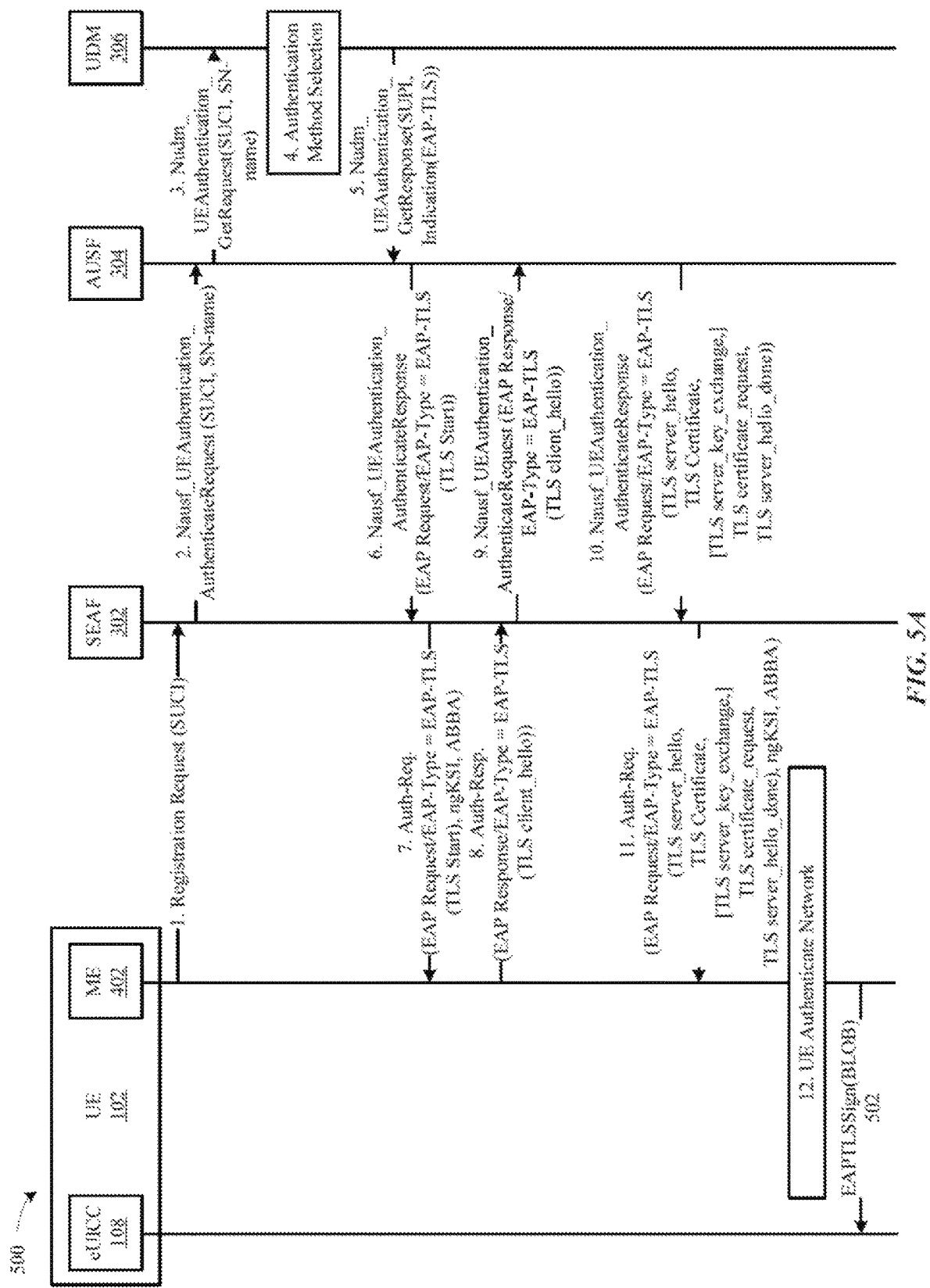
Figure 5C:
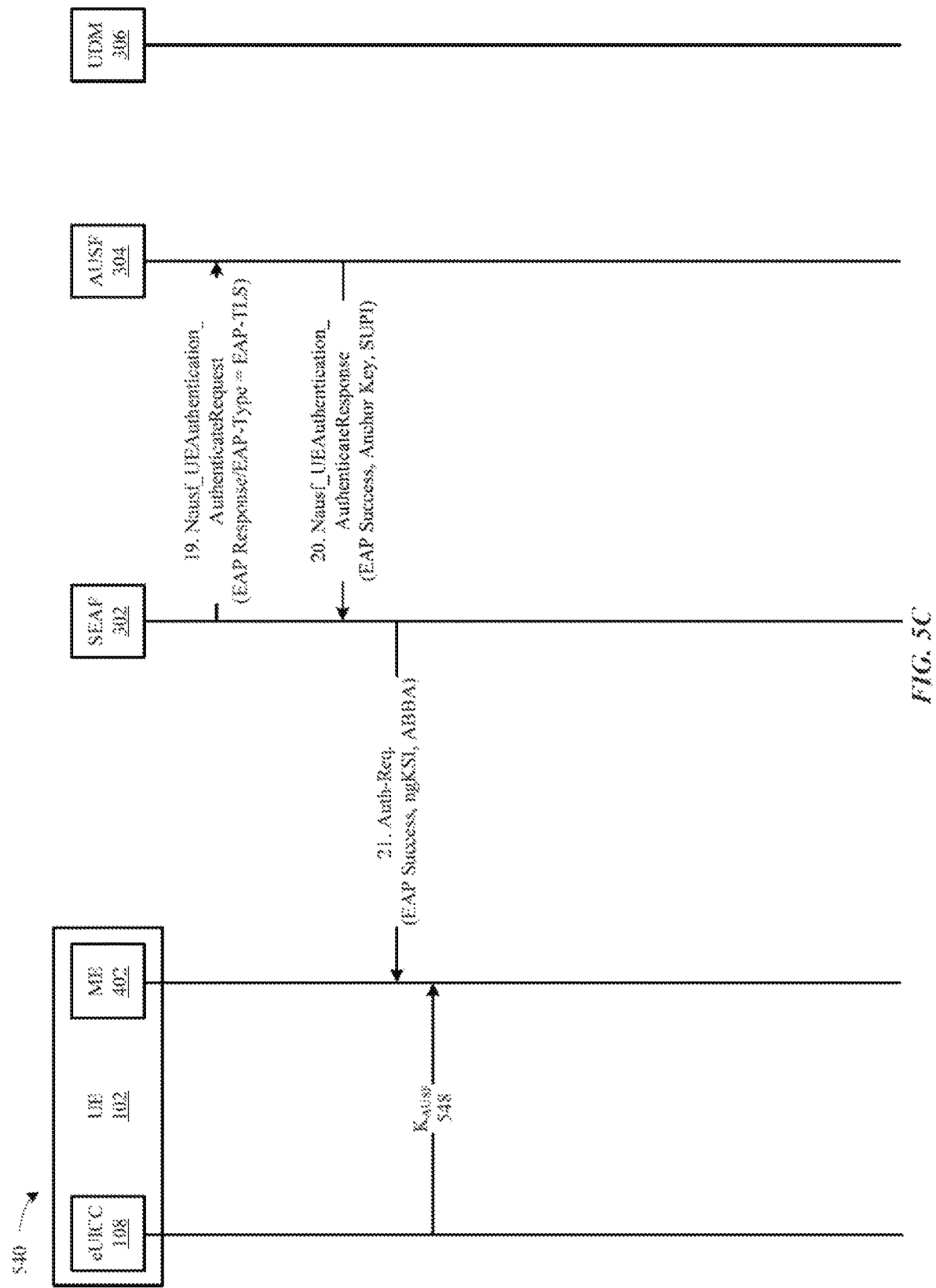

FIGS. 5A, 5B, and 5C illustrate diagrams 500, 520, 540 of another exemplary set of actions performed by different elements of a UE 102 to authenticate the UE 102 with a cellular wireless network using an EAP-TLS procedure. Certain actions performed by the ME 402 of the UE 102 in FIGS. 4A-4C are performed instead by the eUICC 108 of the UE 102 in FIGS. 5A-5C. In particular, the eUICC 108 performs additional cryptographic key generation, storage, and management functions. Actions #1 to #12 are identical in FIG. 5A to those described for FIG. 4A. Verification of the TLS (server) certificate received from the AUSF 304 via the SEAF 302 is performed by the ME 402. After the ME 402 authenticates the cellular wireless network in action #12 by verifying validity of the TLS certificate received in action #11, the ME 402 provides, at 502, a binary large object (BLOB) to the eUICC 108 to apply a digital signature based on an eUICC private signature key and its associated certificate stored and maintained securely by the eUICC 108. The eUICC 108 signs the BLOB at 524 using a signature key associated with the eUICC certificate and returns the signed BLOB along with the eUICC certificate to the ME 402 at 528. In some embodiments, the eUICC 108 also generates an ephemeral key pair {ePK, eSK} at 526 and provides the ephemeral public key portion ePK to the ME 402 along with the signed BLOB and eUICC certificate at 528. In some embodiments, the BLOB signed by the eUICC 108 includes some or all of the content to be provided in the Authentication Response message of subsequent action #13. The ME 402 forwards the Authentication Response that includes the signed BLOB and the eUICC certificate as the TLS (client) certificate to the SEAF 302 to provide to the AUSF 304 for authentication. In some embodiments, the eUICC 108 provides the eUICC certificate to the ME 402 in advance, e.g., before receiving the BLOB at 422, or before signing the BLOB at 502, or before communicating the signed BLOB at 528. In some embodiments, the Authentication Response message of action #13 includes the ephemeral public key ePK generated previously by the eUICC 108 and provided to the ME 402 at 528. The cellular wireless network can use the ephemeral public key ePK in a subsequent cryptographic key generation procedure to determine cipher keys to use for secure communication between the UE 102 and the cellular wireless network. After successful authentication of the UE 102 by the AUSF 304, the eUICC 108 of the UE 102, at 530, can generate a root session key $K_{AUSF}$ by performing an elliptic curve key agreement (ECKA) procedure to obtain an Extended Master Session Key (EMSK), which can be converted to the root session key $K_{AUSF}$. The eUICC 108, at 548, can provide the session key to the ME 402 to subsequently use with a key derivation function (KDF) to generate additional NAS layer and AS layer cryptographic keys for secure communication between the UE 102 and the cellular wireless network. The choice of whether to have the eUICC 108 or the ME 402 generate the root session key $K_{AUSF}$ using the ECKA procedure can depend on which elliptic curves are specified for use by the cellular wireless network. In some embodiments, the eUICC 108 may support a set of elliptic curves that differs by at least one elliptic curve from those supported by the ME 402. If an elliptic curve specified by the cellular wireless network for the ECKA procedure is only supported by the eUICC 108 or the ME 402 and not both, the root session key $K_{AUSF}$ generation can be performed by the portion of the UE 102 that supports the specified elliptic curve.

Figure 6A:
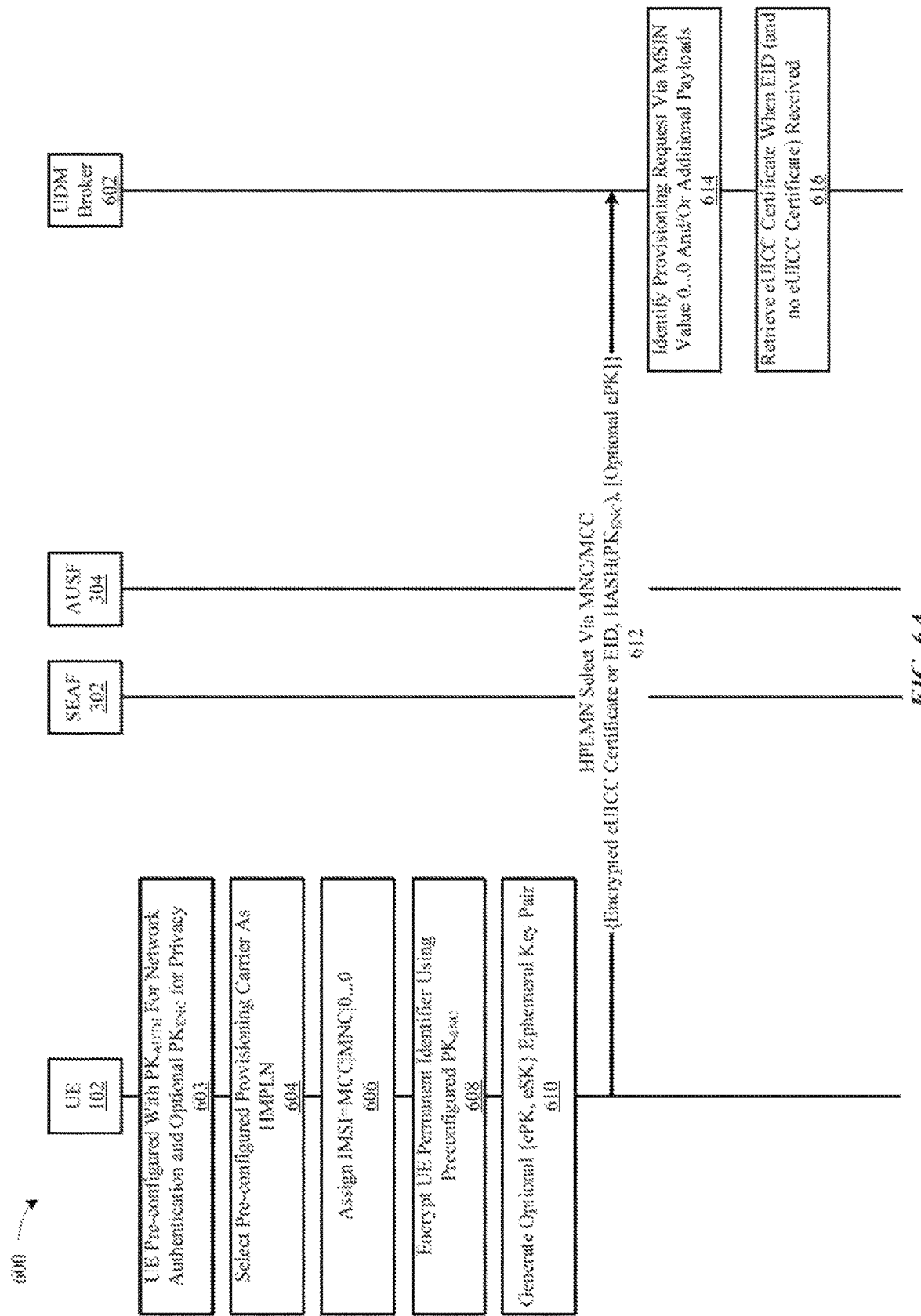
FIGS. 6A and 6B illustrate a further exemplary sequence of actions to authenticate a mobile wireless device with a cellular wireless network, according to some embodiments.
Figure 6B:
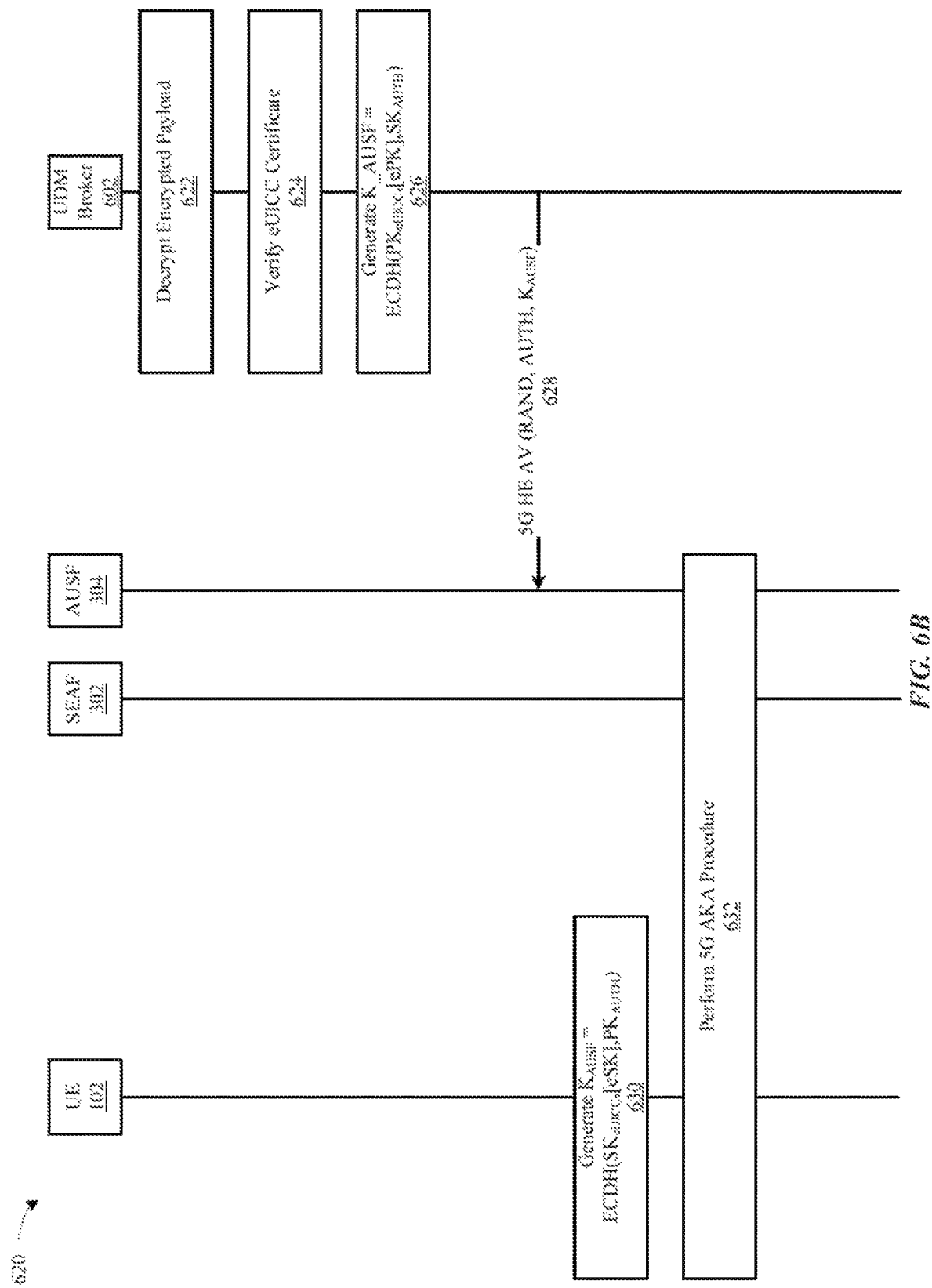

FIGS. 6A and 6B illustrate diagrams 600, 620 of an alternate method to perform mutual authentication of a UE 102 with a cellular wireless network using a modified form of an EAP-AKA procedure, where a third-party network-accessible server, e.g., a Unified Data Management broker 602, authenticates the UE 102 for the cellular wireless network based on information provided by the cellular wireless network. The method illustrated in FIGS. 6A and 6B can be used with cellular wireless networks that do not support EAP-TLS but do support EAP-AKA and agree to allow a third-party managed server, e.g., the UDM broker 602, to provide authentication of the UE 102. In some embodiments, the cellular wireless network allows the UDM broker to authenticate the UE 102 for a limited range of services or for a particular service, e.g., to allow for provisioning an eSIM 208 to the UE 102 without using a pre-installed provisioning eSIM in the UE 102.

The UE 102 can be pre-configured, at 603, with a network authentication public key $PK_{AUTH}$ and optionally with a network privacy public key $PK_{ENC}$ to use for encryption of a permanent identifier of the UE 102. The UE 102, at 604, can select for an HPLMN a pre-configured provisioning MNO (carrier) with which to authenticate. At 606, the UE 102 can construct a dummy IMSI based on a combination of MCC and MNC values for the selected HPLMN and an unused MSIN value, e.g., an all-zeroes MSIN value. The UE 102, at 608, can optionally encrypt a permanent identifier of the UE 102, e.g., an eUICC identifier (EID), using the pre-configured network privacy public key $PK_{ENC}$. In some embodiments, at 610, the UE 102 generates an ephemeral key pair {ePK, eSK}. At 612, the UE 102, provides to the UDM broker 602, via the SEAF 302 and AUSF 304, a message that includes the encrypted ED or an encrypted version of the eUICC certificate, a HASH value serving as a key identifier for the network privacy public key $PK_{ENC}$, and optionally the ephemeral public key ePK. The AUSF 304 can use the dummy IMSI value to identify the UDM broker 602 to which to forward the message from the UE 102. The UDM broker 602 can have an agreement with the MNO to which the MCC/MNC values of the dummy IMSI value correspond. The UDM broker 602 can authenticate the UE 102 based on the provided encrypted permanent identifier of the UE 102, e.g., an encrypted version of the EID, or based on the encrypted eUICC certificate provided at 612. An encrypted eUICC certificate may not need to be provided by the UE 102 to the UDM broker 602 if identification using the encrypted permanent identifier of the UE 102 suffices to specify to the UDB broker an associated eUICC certificate that is pre-configured in the eUICC 108 of the UE 102. In some embodiments, the UDM broker 602 can map the permanent identifier of the UE 102, e.g., the EID value (after decryption by the UDM broker) 602, to an appropriate matching eUICC certificate for the UE 102. In some embodiments, identification of the UE 102 using the permanent identifier can be preferred to reduce network signaling requirements, as an eUICC certificate can be significantly larger than the permanent identifier. The UDM broker 602, at 614, can identify the message received from the UE 102 as a provisioning request based on the unused MSIN value (e.g., all-zeroes value) included in the dummy IMSI and/or based on additional payload information included in the message received from the UE 102. The UDM broker 602 can identify the network privacy key $PK_{ENC}$ used by the UE 102 based on the HASH($PK_{ENC}$) value included in the message and decrypt encrypted payload portions as required. The UDM broker 602 can retrieve, at 616, an applicable eUICC certificate for the UE 102 from a database using the received permanent identifier of the UE 102 value, e.g., the EID value when no eUICC certificate is included in the message from the UE 102. The UDM broker 602, at 622, can decrypt a payload of the message from the UE 102 using a public key $PK_{eUICC}$ associated with the eUICC 108 of the UE 102, e.g., a public key for the eUICC associated with the eUICC certificate. The UDM broker 602, at 624, can verify validity of the eUICC certificate and subsequently, at 626, generate a root session key $K_{AUSF}$ for the cellular wireless network to use for a 5G AKA procedure at 632. The root session key $K_{AUSF}$ can be generated using an elliptic curve key agreement (ECKA) procedure, e.g., an Elliptic Curve Diffie-Hellman (ECDH) function or the like, with the eUICC public key $PK_{eUICC}$ and the private network authentication key $SK_{AUTH}$ as inputs. In some embodiments, the ephemeral public key ePK from the UE 102 is also used for the root session key generation, such as i) performing a first ECDH function using $PK_{eUICC}$ as an input to generate a first shared secret, ii) performing a second ECDH function using ePK as an input to generate a second shared secret, and iii) combining the first and second shared secrets using another function to generate the root session key $K_{AUSF}$. In some embodiments, the ECDH function is performed with the ePK as an input and not using the eUICC public key $PK_{eUICC}$ as an input to generate the session key $K_{AUSF}$. In some embodiments, the eUICC public key $PK_{eUICC}$ is used for signature verification by the UDM broker 602, where the ephemeral public key ePK received at 612 is signed with a signature based on $PK_{eUICC}$. At 628, the UDM broker 602 provides to the AUSF 304 of the cellular wireless network a 5G authentication vector (AV) that includes an indication (AUTH) that the UE 102 successfully passed authentication and the generated root session key $K_{AUSF}$ to use for additional cryptographic key generation for secure communication between the cellular wireless network and the UE 102. The UE 102, at 630, can separately generate the root session key $K_{AUSF}$ by performing an elliptic curve key agreement (ECKA) procedure, e.g., an ECDH function or the like, using the eUICC private key $SK_{eUICC}$ and the public network authentication key $PK_{AUTH}$ as inputs. In some embodiments, when the eUICC ephemeral key pair is to be used, the ephemeral private key eSK can also be input to the ECDH function. At 632, the UE 102 and network entities of the cellular wireless network, e.g., SEAF 302 and/or AUSF 304, perform a 5G Authentication and Key Agreement (AKA) procedure.

Roaming Scenarios

In some scenarios, the UE 102 seeks to authenticate itself while roaming in a serving cellular wireless network that differs from a home cellular wireless network with which the UE 102 is associated. The SEAF 302, which is located in an access network portion of a local wireless network to which the UE 102 is attached for local communication, can be part of a different cellular wireless network from the AUSF 304, which is located in a core network portion of a home wireless network associated with the UE 102 and with which the UE 102 seeks to authenticate itself. The SEAF 302 of the roaming cellular wireless network need not support the complete EAP-TLS procedure for authentication to proceed but does need to support EAP message transfers. The SEAF 302 can include an EAP layer stack to allow for transfer of EAP payloads between the UE 102 and the AUSF 304 without requiring the SEAF 302 to interpret the EAP payload contents of the messages transferred.

Figure 7:
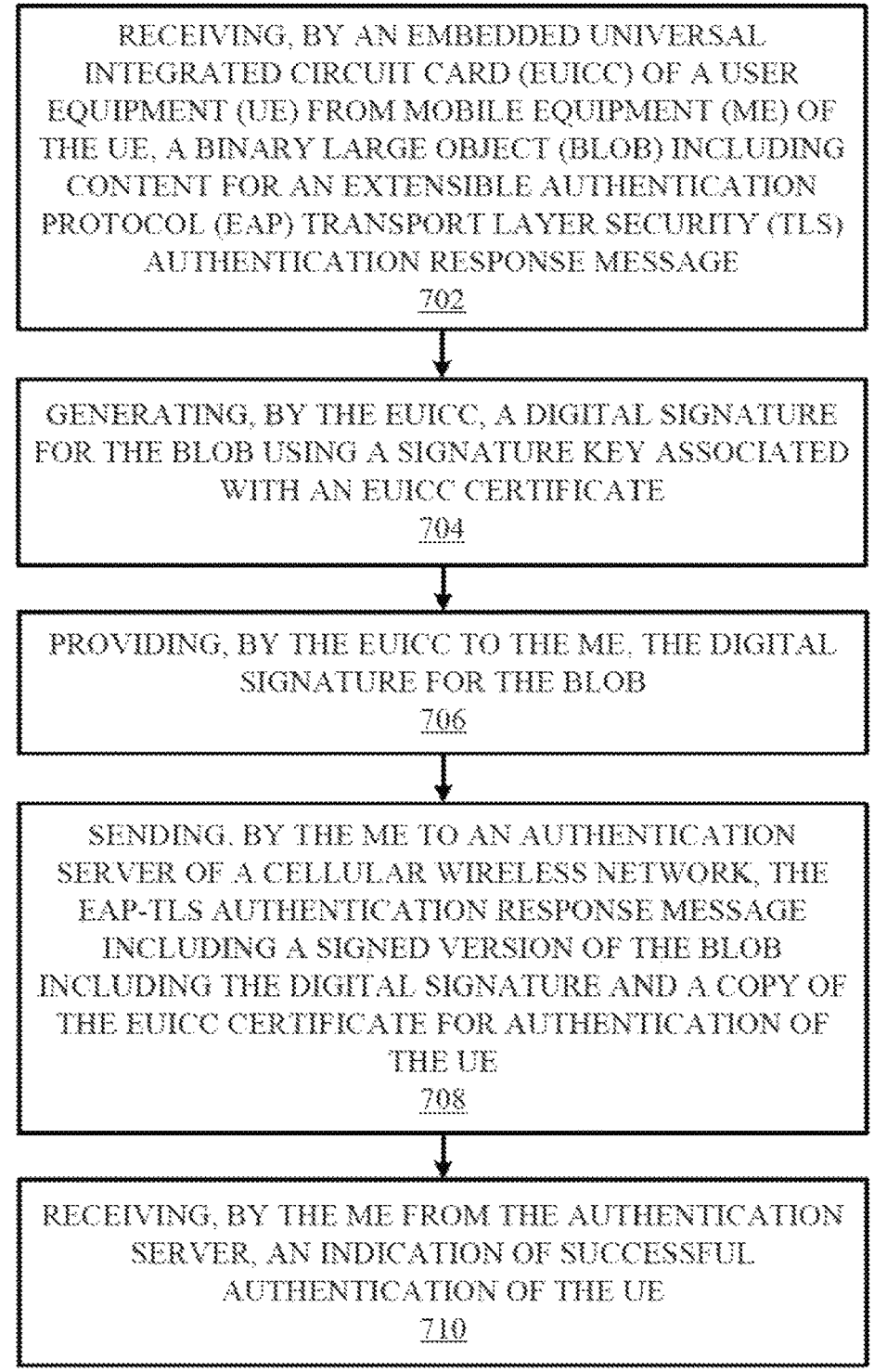
FIG. 7 illustrates a flowchart of an exemplary method to authenticate a mobile wireless device with a cellular wireless network, according to some embodiments.

FIG. 7 illustrates a flowchart 700 of an exemplary method to authenticate a UE 102 with a cellular wireless network. At 702, the eUICC 108 of the UE 102 receives from the ME 402 of the UE 102, a binary large object (blob) including content for an EAP-TLS authentication response message. At 704, the eUICC 108 generates a digital signature for the blob using a signature key associated with an eUICC certificate maintained by the eUICC 108 of the UE 102. At 706, the eUICC 108 provides to the ME 402 the digital signature for the blob. At 708, the ME 402 sends to an authentication server of the cellular wireless network, e.g., to AUSF 304 via SEAF 302, the EAP-TLS authentication response message including a signed version of the blob including the digital signature and a copy of the eUICC certificate for authentication of the UE 102. At 710, the ME 402 receives from the authentication server, an indication of successful authentication of the UE 102.

In some embodiments, the method further includes the ME 402 generating a root session key $K_{AUSF}$ using an elliptic curve key agreement (ECKA) based on a static private key of the eUICC ($SK_{eUICC}$) and/or an ephemeral private key (eSK) generated by the ME 402. In some embodiments, the method further includes the ME 402 generating an ephemeral key pair including an ephemeral public key (ePK) and the ephemeral private key eSK, where the EAP-TLS authentication response message includes the ephemeral public key ePK. In some embodiments, the eUICC 108 generates a root session key $K_{AUSF}$, using an elliptic curve key agreement (ECKA) based on a static private key of the eUICC ($SK_{eUICC}$) and/or an ephemeral private key (eSK) generated by the eUICC, and provides the root session key $K_{AUSF}$ to the ME 402. In some embodiments, the method further includes the eUICC 108 generating an ephemeral key pair, including an ephemeral public key (ePK) and the ephemeral private key eSK, and providing to the ME 402 the ephemeral public key ePK, where the EAP-TLS authentication response message further includes the ephemeral public key ePK. In some embodiments, the method further includes the ME 402 deriving one or more cryptographic keys for secure communication between the UE 102 and the cellular wireless network based on a root session key $K_{AUSF}$ derived by the ME 402 or by the eUICC 108.

Figure 8:
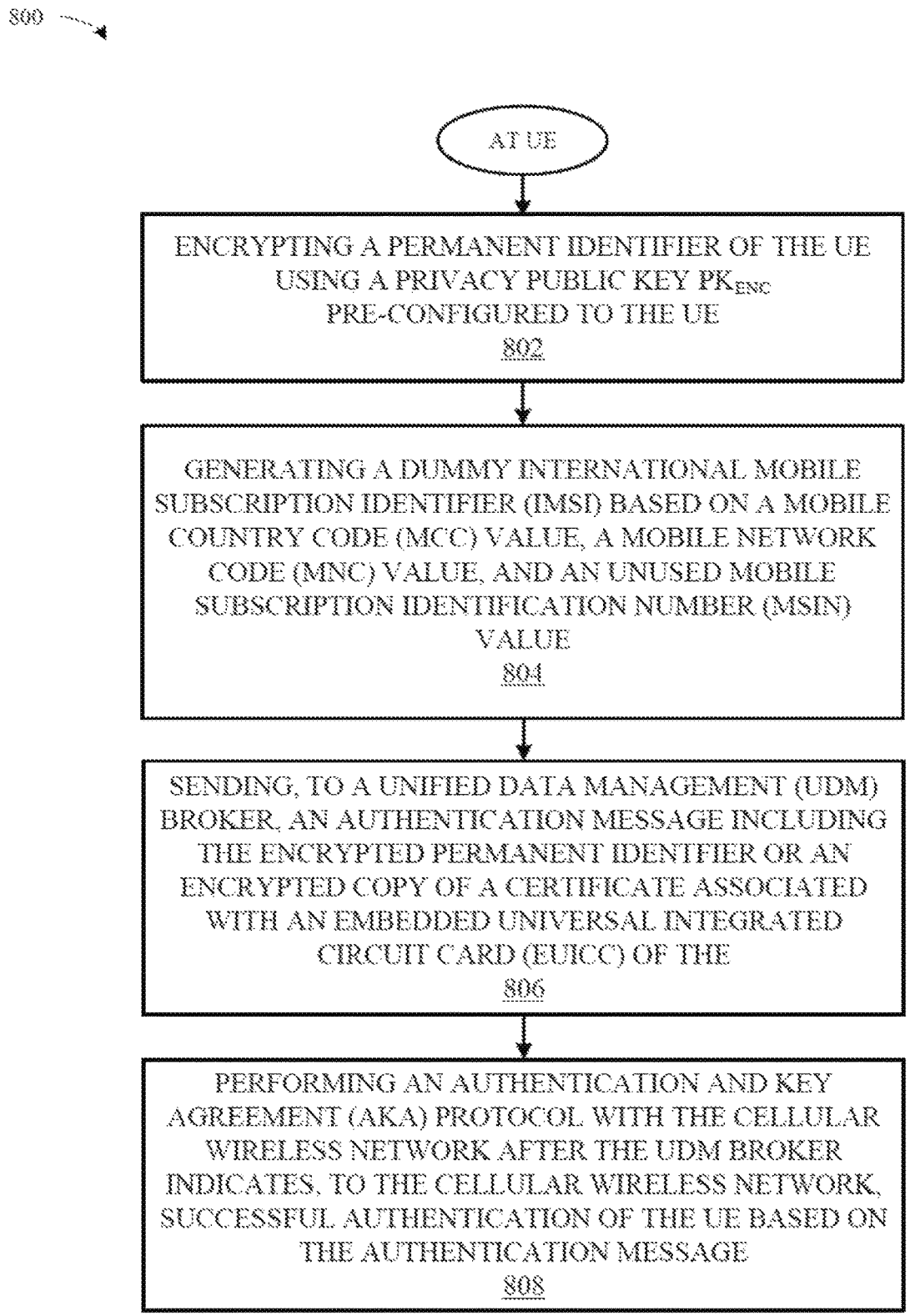
FIG. 8 illustrates a flowchart of another exemplary method to authenticate a mobile wireless device with a cellular wireless network, according to some embodiments.

FIG. 8 illustrates a flowchart 800 of another exemplary method to authenticate a UE 102 with a cellular wireless network. At 802, the UE 102 encrypts a permanent identifier of the UE 102 using a privacy public key $PK_{ENC}$ pre-configured to the UE 102. At 804, the UE 102 generates a dummy international mobile subscription identifier (IMSI) based on a mobile country code (MCC) value, a mobile network code (MNC) value, and an unused mobile subscription identification number (MSIN) value. At 806, the UE 102 sends, to a unified data management (UDM) broker 602, an authentication message including the encrypted permanent identifier or an encrypted copy of a certificate associated with an eUICC 108 of the UE 102 and the dummy IMSI. At 808, the UE 102 performs an authentication and key agreement (AKA) protocol with the cellular wireless network after the UDM broker 602 indicates, to the cellular wireless network, successful authentication of the UE 102 based on the authentication message.

In some embodiments, the method further includes the UE 102 generating a root session key $K_{AUSF}$ using an elliptic curve key agreement (ECKA) based on a static private key of the eUICC ($SK_{eUICC}$) and/or an ephemeral private key (eSK) generated by the UE 102. In some embodiments, the root session key $K_{AUSF}$ is further based on an authentication public key ($PK_{AUTH}$) pre-configured to the UE 102 during manufacture or distribution of the UE 102. In some embodiments, the authentication public key $PK_{AUTH}$ is pre-configured to the eUICC 108 of the UE 102. In some embodiments, the UE 102 sends the authentication message to the UDM broker 602 via a security anchor function (SEAF) 302 of a serving network and via an authentication server function (AUSF) 304 of a core network. In some embodiments, the SEAF 302 is a roaming network entity for the UE 102, and the AUSF 304 is a home network entity for the UE 102. In some embodiments, the SEAF 302 identifies the cellular wireless network of the AUSF 304 based on the MCC value and the MNC value included in the dummy IMSI. In some embodiments, the UDM broker 602 identifies that the UE 102 requests authentication based on the unused MSIN value in the dummy IMSI. In some embodiments, the unused MSIN value is an all-zeroes value. In some embodiments, the UE 102 generates an ephemeral key pair including an ephemeral public key (ePK) and an ephemeral private key (eSK), where the authentication message sent to the UDM broker 602 further includes the ephemeral public key ePK. In some embodiments, the UE 102 generates a root session key $K_{AUSF}$ using an elliptic curve key agreement (ECKA) based on the ephemeral private key (eSK) generated by the UE 102, where the UDM broker 602 generates, based on the ephemeral public key ePK, and provides, to an authentication server function (AUSF) 304 of the cellular wireless network, an identical copy of the root session key $K_{AUSF}$.

Figure 9:
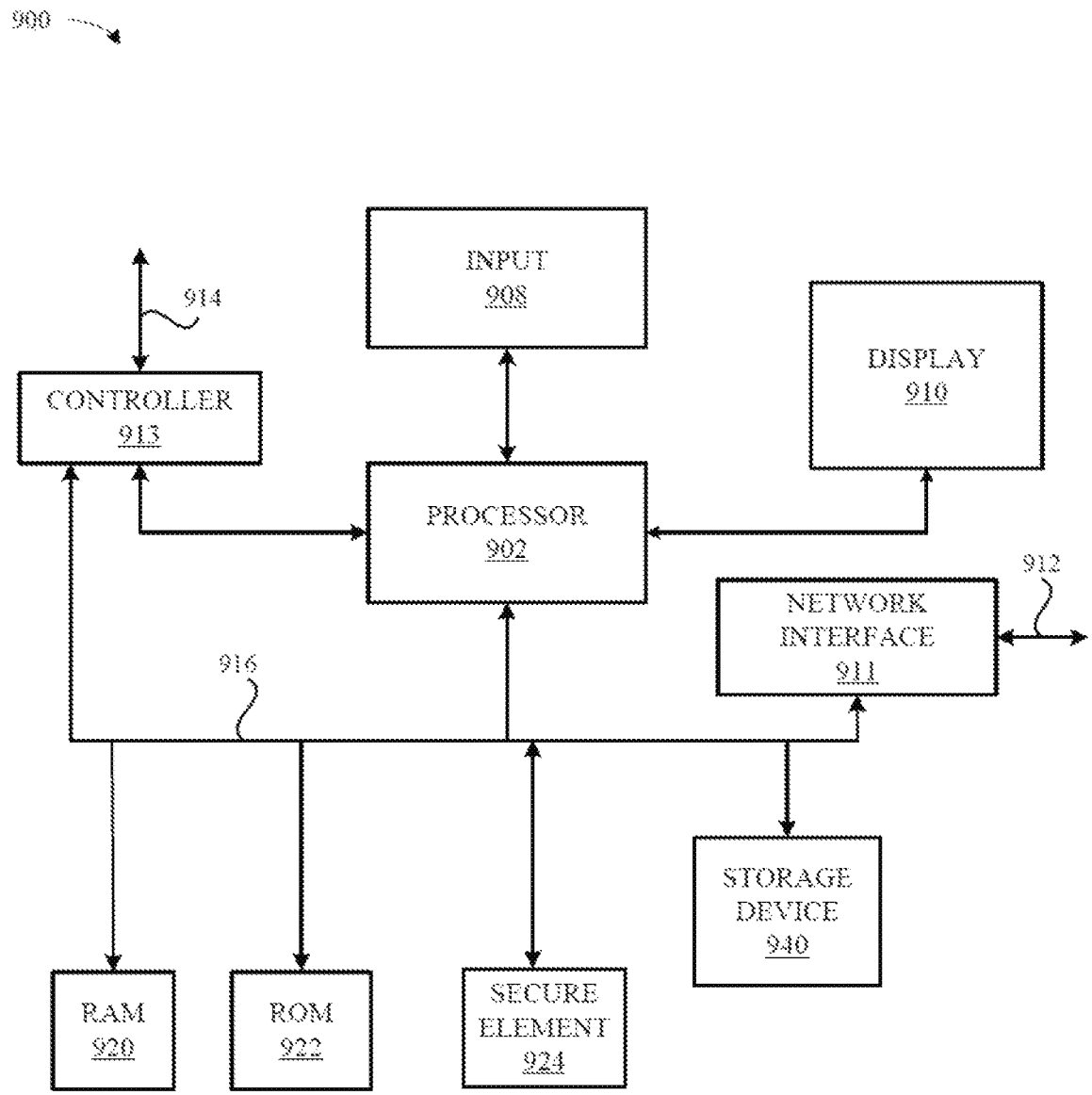
FIG. 9 illustrates a block diagram of exemplary elements of a mobile wireless device, according to some embodiments.

FIG. 9 illustrates a detailed view of a representative computing device 900 that can be used to implement various methods described herein, according to some embodiments. In particular, the detailed view illustrates various components that can be included in the UE 102. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 that can be controlled by the processor 902 to display information to the user. A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that communicatively couples to a data link 912. In the case of a wireless connection, the network/bus interface 911 can include a wireless transceiver.

The computing device 900 also includes a storage device 940, which can comprise a single disk or a plurality of disks (e.g., hard drives), and includes a storage management module that manages one or more partitions within the storage device 940. In some embodiments, storage device 940 can include flash memory, semiconductor (solid state) memory or the like. The computing device 900 can also include a Random Access Memory (RAM) 920 and a Read-Only Memory (ROM) 922. The ROM 922 can store programs, utilities or processes to be executed in a non-volatile manner. The RAM 920 can provide volatile data storage, and stores instructions related to the operation of the computing device 900. The computing device 900 can further include a secure element (SE) 924, which can represent secure storage for cellular wireless system access by the UE 102. The secure element 924 can include an eUICC 108 on which to store one or more eSIMs 208.

Wireless Terminology

In accordance with various embodiments described herein, the terms "wireless communication device," "wireless device," "mobile wireless device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for authentication of a user equipment (UE) with a cellular wireless network, the method comprising:

by the UE:
encrypting a permanent identifier of the UE using a privacy public key $PK_{ENC}$ pre-configured to the UE;
generating a dummy international mobile subscription identifier (IMSI) based on a mobile country code (MCC) value, a mobile network code (MNC) value, and an unused mobile subscription identification number (MSIN) value;
sending, to a unified data management (UDM) broker, an authentication message comprising the encrypted permanent identifier or an encrypted copy of a certificate associated with an embedded universal integrated circuit card (eUICC) of the UE and the dummy IMSI; and
performing an authentication and key agreement (AKA) protocol with the cellular wireless network after the UDM broker indicates, to the cellular wireless network, successful authentication of the UE based on the authentication message.

2. The method of claim 1, further comprising:
by the UE:
generating a root session key KAUSF using an elliptic curve key agreement (ECKA) based on a static private key of the eUICC ($SK_{eUICC}$) and/or an ephemeral private key (eSK) generated by the UE.

3. The method of claim 2, wherein the root session key KAUSF is further based on an authentication public key ($PK_{AUTH}$) pre-configured to the UE during manufacture or distribution of the UE.

4. The method of claim 3, wherein the authentication public key $PK_{AUTH}$ is pre-configured to the eUICC of the UE.

5. The method of claim 1, wherein the UE sends the authentication message to the UDM broker via a security anchor function (SEAF) of a serving network and via an authentication server function (AUSF) of a core network.

6. The method of claim 5, wherein:
the SEAF is a roaming network entity for the UE; and
the AUSF is a home network entity for the UE.

7. The method of claim 5, wherein the SEAF identifies the cellular wireless network of the AUSF based on the MCC value and the MNC value included in the dummy IMSI.

8. The method of claim 1, wherein the UDM broker identifies that the UE requests authentication based on the unused MSIN value in the dummy IMSI.

9. The method of claim 1, further comprising:
by the UE:
generating an ephemeral key pair comprising an ephemeral public key (ePK) and an ephemeral private key (eSK);

wherein the authentication message sent to the UDM broker further comprises the ephemeral public key ePK.

10. The method of claim 9, further comprising:
by the UE:
generating a root session key KAUSF using an elliptic curve key agreement (ECKA) based on the ephemeral private key (eSK) generated by the UE,
wherein the UDM broker generates, based on the ephemeral public key ePK, and provides, to an authentication server function (AUSF) of the cellular wireless network, an identical copy of the root session key $K_{AUSF}$.

11. A user equipment (UE) comprising:
wireless circuitry comprising one or more antennas; and
one or more processors communicatively coupled to the wireless circuitry and to a memory storing instructions that, when executed by the one or more processors, cause the UE to authenticate with a cellular wireless network by:
encrypting a permanent identifier of the UE using a privacy public key $PK_{ENC}$ preconfigured to the UE;
generating a dummy international mobile subscription identifier (IMSI) based on a mobile country code (MCC) value, a mobile network code (MNC) value, and an unused mobile subscription identification number (MSIN) value;
sending, to a unified data management (UDM) broker, an authentication message comprising the encrypted permanent identifier or an encrypted copy of a certificate associated with an embedded universal integrated circuit card (eUICC) of the UE and the dummy IMSI; and
performing an authentication and key agreement (AKA) protocol with the cellular wireless network after the UDM broker indicates, to the cellular wireless network, successful authentication of the UE based on the authentication message.

12. The UE of claim 11, wherein execution of the instructions further causes the UE to authenticate with the cellular wireless network by:
generating a root session key $K_{AUSF}$ using an elliptic curve key agreement (ECKA) based on a static private key of the eUICC ($SK_{eUICC}$) and/or an ephemeral private key (eSK) generated by the UE.

13. The UE of claim 12, wherein:
the root session key $K_{AUSF}$ is further based on an authentication public key ($PK_{AUTH}$) pre-configured to the UE during manufacture or distribution of the UE; and
the authentication public key $PK_{AUTH}$ is pre-configured to the eUICC of the UE.

14. The UE of claim 11, wherein the UE sends the authentication message to the UDM broker via a security anchor function (SEAF) of a serving network and via an authentication server function (AUSF) of a core network.

15. The UE of claim 14, wherein:
the serving network is a roaming network entity for the UE; and
the AUSF is a home network entity for the UE.

16. The UE of claim 14, wherein the SEAF identifies the cellular wireless network of the AUSF based on the MCC value and the MNC value included in the dummy IMSI.

17. The UE of claim 11, wherein the UDM broker identifies the UE requests authentication based on the unused MSIN value in the dummy IMSI.

18. The UE of claim 11, wherein execution of the instructions further causes the UE to authenticate with the cellular wireless network by:
generating an ephemeral key pair comprising an ephemeral public key (ePK) and an ephemeral private key (eSK), wherein the authentication message sent to the UDM broker further comprises the ephemeral public key ePK.

19. The UE of claim 18, wherein execution of the instructions further causes the UE to authenticate with the cellular wireless network by:
generating a root session key $K_{AUSF}$ using an elliptic curve key agreement (ECKA) based on the ephemeral private key (eSK) generated by the UE,
wherein the UDM broker generates, based on the ephemeral public key ePK, and provides, to an authentication server function (AUSF) of the cellular wireless network, an identical copy of the root session key $K_{AUSF}$.

20. A non-transitory computer readable medium storing instructions for authentication of a user equipment (UE) with a cellular wireless network, wherein the instructions configure the UE to perform actions including:
encrypting a permanent identifier of the UE using a privacy public key $PK_{ENC}$ pre-configured to the UE;
generating a dummy international mobile subscription identifier (IMSI) based on a mobile country code (MCC) value, a mobile network code (MNC) value, and an unused mobile subscription identification number (MSIN) value;
sending, to a unified data management (UDM) broker, an authentication message comprising the encrypted permanent identifier or an encrypted copy of a certificate associated with an embedded universal integrated circuit card (eUICC) of the UE and the dummy IMSI; and
performing an authentication and key agreement (AKA) protocol with the cellular wireless network after the UDM broker indicates, to the cellular wireless network, successful authentication of the UE based on the authentication message.

21. The non-transitory computer readable medium of claim 20, wherein the instructions further configure the UE to:
generate a root session key $K_{AUSF}$ using an elliptic curve key agreement (ECKA) based on a static private key of the eUICC ($SK_{eUICC}$) and/or an ephemeral private key (eSK) generated by the UE.

22. The non-transitory computer readable medium of claim 21, wherein the root session key $K_{AUSF}$ is further based on an authentication public key ($PK_{AUTH}$) pre-configured to the UE during manufacture or distribution of the UE.

23. The non-transitory computer readable medium of claim 22, wherein the authentication public key $PK_{AUTH}$ is pre-configured to the eUICC of the UE.

24. The non-transitory computer readable medium of claim 20, wherein the instructions further configure the UE to:
generate an ephemeral key pair comprising an ephemeral public key (ePK) and an ephemeral private key (eSK);
wherein the authentication message sent to the UDM broker further comprises the ephemeral public key ePK.

25. The non-transitory computer readable medium of claim 24, wherein the instructions further configure the UE to:
generate a root session key $K_{AUSF}$ using an elliptic curve key agreement (ECKA) based on the ephemeral private key (eSK) generated by the UE,
wherein the UDM broker generates, based on the ephemeral public key ePK, and provides, to an authentication server function (AUSF) of the cellular wireless network, an identical copy of the root session key $K_{AUSF}$.

* * * * *

UNITED STATES PATENT AND TRADEMARK OFFICE
CERTIFICATE OF CORRECTION

| | | |
|---|---|---|
| PATENT NO. | : 12,101,630 B2 | Page 1 of 1 |
| APPLICATION NO. | : 17/634950 | |
| DATED | : September 24, 2024 | |
| INVENTOR(S) | : Xiangying Yang et al. | |

It is certified that error appears in the above-identified patent and that said Letters Patent is hereby corrected as shown below:

In the Specification

At Column 1, Line 22: "(eSIM), or a prAovisioning SIM." should read -- (eSIM), or a provisioning SIM. --.

At Column 1, Line 44: "of one or more electronic SIMS (eSIMs) on the eUICC," should read -- of one or more electronic SIMs (eSIMs) on the eUICC, --.

At Column 6, Line 62: "configured to store multiple electronic SIMS (eSIMs) for" should read -- configured to store multiple electronic SIMs (eSIMs) for --.

At Column 12, Line 16: "message that includes the encrypted ED or an encrypted" should read -- message that includes the encrypted EID or an encrypted --.

Signed and Sealed this
Second Day of December, 2025

John A. Squires
*Director of the United States Patent and Trademark Office*